US012189037B2

(12) United States Patent
Lasang et al.

(10) Patent No.: US 12,189,037 B2
(45) Date of Patent: Jan. 7, 2025

(54) THREE-DIMENSIONAL POINT CLOUD GENERATION METHOD, POSITION ESTIMATION METHOD, THREE-DIMENSIONAL POINT CLOUD GENERATION DEVICE, AND POSITION ESTIMATION DEVICE

(71) Applicant: Panasonic Intellectual Property Corporation of America, Torrance, CA (US)

(72) Inventors: Pongsak Lasang, Singapore (SG); Chi Wang, Singapore (SG); Zheng Wu, Singapore (SG); Sheng Mei Shen, Singapore (SG); Toshiyasu Sugio, Osaka (JP); Tatsuya Koyama, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 394 days.

(21) Appl. No.: 16/877,835

(22) Filed: May 19, 2020

(65) Prior Publication Data

US 2020/0278450 A1  Sep. 3, 2020

Related U.S. Application Data

(63) Continuation of application No. PCT/JP2018/042423, filed on Nov. 16, 2018.
(Continued)

(51) Int. Cl.
| | | |
|---|---|---|
| *G01S 17/894* | (2020.01) | |
| *G06T 7/521* | (2017.01) | |
| *G06T 7/73* | (2017.01) | |

(52) U.S. Cl.
CPC .......... *G01S 17/894* (2020.01); *G06T 7/521* (2017.01); *G06T 7/73* (2017.01); *G06T 2207/10028* (2013.01); *G06T 2207/30252* (2013.01)

(58) Field of Classification Search
CPC ........... G06T 7/11; G06T 2207/10028; G06T 2207/20084; G06T 17/00;
(Continued)

(56) References Cited

U.S. PATENT DOCUMENTS

| | | | |
|---|---|---|---|
| 5,850,226 A | 12/1998 | Nagasawa et al. | |
| 2012/0013710 A1* | 1/2012 | Ehrlich | G06T 17/20 348/46 |

(Continued)

FOREIGN PATENT DOCUMENTS

| | | |
|---|---|---|
| JP | 9-237354 | 9/1997 |
| JP | 2012-242317 | 12/2012 |

(Continued)

OTHER PUBLICATIONS

Extended European Search Report issued Apr. 29, 2021 in corresponding European Patent Application No. 18879366.5.
(Continued)

*Primary Examiner* — Xiao M Wu
*Assistant Examiner* — Scott E Sonners
(74) *Attorney, Agent, or Firm* — Wenderoth, Lind & Ponack, L.L.P.

(57) ABSTRACT

A three-dimensional point cloud generation method for generating a three-dimensional point cloud including one or more three-dimensional points includes: obtaining (i) a two-dimensional image obtained by imaging a three-dimensional object using a camera and (ii) a first three-dimensional point cloud obtained by sensing the three-dimensional object using a distance sensor; detecting, from the two-
(Continued)

dimensional image, one or more attribute values of the two-dimensional image that are associated with a position in the two-dimensional image; and generating a second three-dimensional point cloud including one or more second three-dimensional points each having an attribute value, by performing, for each of the one or more attribute values detected, (i) identifying, from a plurality of three-dimensional points forming the first three-dimensional point cloud, one or more first three-dimensional points to which the position of the attribute value corresponds, and (ii) appending the attribute value to the one or more first three-dimensional points identified.

20 Claims, 11 Drawing Sheets

Related U.S. Application Data

(60) Provisional application No. 62/588,596, filed on Nov. 20, 2017.

(58) Field of Classification Search
CPC .......... G06T 2207/10016; G06T 7/73; G06T 19/006; G06T 7/70; G06T 2200/04; G06T 7/33; G06T 2207/10024; G06T 7/246; G06T 2207/30244; G06T 7/50; G06T 15/205; G06T 2200/08; G06T 7/55; G06T 19/00; G06T 7/593; G06T 7/74; G06T 7/75; G06T 7/20; G06T 7/60; G06T 7/337; G06T 7/90; G06T 2207/30252; G06T 2215/16; G06T 7/521; G06T 2207/20221; G06T 7/174; G06T 7/97; G06T 15/00; G06T 2219/004; G06T 7/00; G06T 2207/20212; G06T 2207/30248; G06T 2210/32; G06V 20/20; G06V 20/10; G06V 10/751; G06V 10/82; G06V 20/64; G06V 10/462; G06V 10/40; G06V 10/255; G06V 10/56; G06V 20/647; G06V 10/10; G06V 10/44; G06V 20/56; G06V 20/58; G06V 20/46; G06V 40/172; G06V 2201/12; G06V 20/698
See application file for complete search history.

(56) References Cited

U.S. PATENT DOCUMENTS

| 2014/0010407 A1* | 1/2014 | Sinha ........................ G06T 7/73 |
| | | 382/103 |
| 2014/0152660 A1* | 6/2014 | Lee .......................... G06T 11/60 |
| | | 345/420 |
| 2015/0324658 A1* | 11/2015 | Zhang ..................... G06F 18/256 |
| | | 382/203 |
| 2016/0247284 A1* | 8/2016 | Zaytsev ..................... G06T 7/50 |
| 2017/0214943 A1 | 7/2017 | Cohen et al. |
| 2017/0220887 A1* | 8/2017 | Fathi ........................ G06V 20/70 |
| 2017/0270682 A1 | 9/2017 | Tasaki et al. |
| 2018/0101932 A1* | 4/2018 | Kwon ....................... G06T 7/50 |

FOREIGN PATENT DOCUMENTS

| JP | 2013-069235 | 4/2013 |
| JP | 2013-077165 | 4/2013 |
| JP | 2013-101592 | 5/2013 |
| JP | 2016-110210 | 6/2016 |
| JP | 2017-53795 | 3/2017 |
| JP | 2017-167974 | 9/2017 |
| JP | 2018-534881 | 11/2018 |
| WO | 2017/163384 | 9/2017 |

OTHER PUBLICATIONS

Henry, Peter et al., "RGB-D mapping: Using Kinect-style depth cameras for dense 3D modeling of indoor environments", The International Journal of Robotics Research, vol. 31, No. 5, Feb. 10, 2012, pp. 1-17.

International Search Report (ISR) issued on Feb. 12, 2019 in International (PCT) Application No. PCT/JP2018/042423.

Rameau et al., "A Real-time Augmented Reality System to See-Through Cars", Jan. 20, 2015.

Extended European Search Report issued Nov. 7, 2023 in European Patent Application No. 23187013.0.

Kai Liu et al.: "Simplification of Point Cloud Data Based on Gaussian Curvature", IET International Conference on Smart and Sustainable City 2013, Aug. 31, 2013 (Aug. 31, 2013), pp. 84-87, XP055509347.

Song Xibin et al: "Modeling deviations of rgb-d cameras for accurate depth map and color image registration", Multimedia Tools and Applications, Kluwer Academic Publishers, Boston, US, vol. 77, No. 12, Aug. 31, 2017 (Aug. 31, 2017), pp. 14951-14977, XP036534889.

* cited by examiner

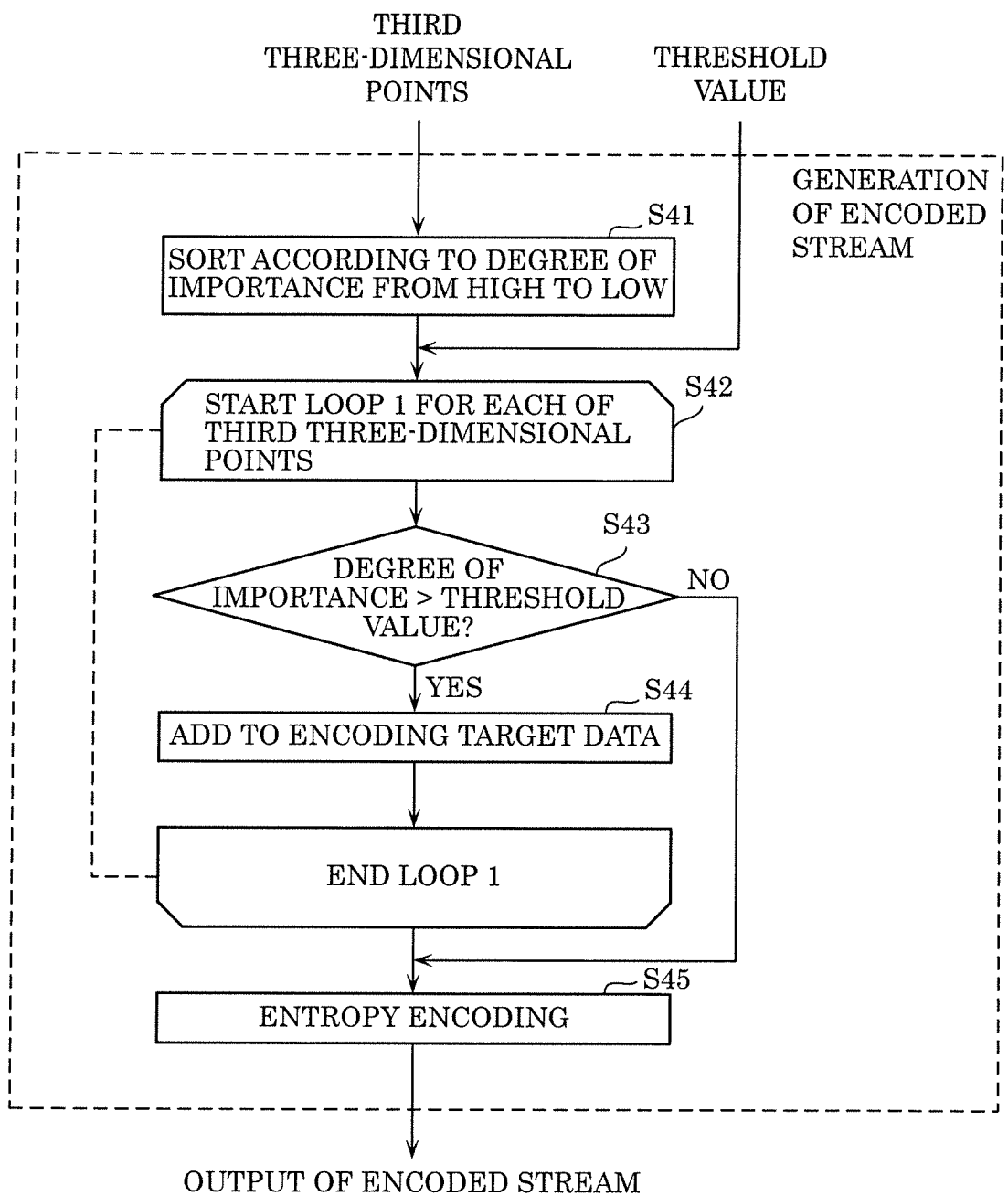

THREE-DIMENSIONAL POINT CLOUD GENERATION METHOD, POSITION ESTIMATION METHOD, THREE-DIMENSIONAL POINT CLOUD GENERATION DEVICE, AND POSITION ESTIMATION DEVICE

CROSS REFERENCE TO RELATED APPLICATIONS

This application is a U.S. continuation application of PCT International Patent Application Number PCT/JP2018/042423 filed on Nov. 16, 2018, claiming the benefit of priority of U.S. Provisional Patent Application No. 62/588,596 filed on Nov. 20, 2017, the entire contents of which are hereby incorporated by reference.

BACKGROUND

1. Technical Field

The present disclosure relates to a three-dimensional point cloud generation method, a position estimation method, a three-dimensional point cloud generation device, and a position estimation device.

2. Description of the Related Art

Japanese Unexamined Patent Application Publication No. 9-237354 discloses a method for transferring three-dimensional shape data. In Japanese Unexamined Patent Application Publication No. 9-237354, three-dimensional shape data is, for example, sent out to a network per element, such as a polygon or a voxel. At a receiver side, this three-dimensional shape data is collected, and an image is developed and displayed per received element.

SUMMARY

However, Japanese Unexamined Patent Application Publication No. 9-237354 was considered to require further improvement.

In order to achieve the above object, a three-dimensional point cloud generation method for generating, using a processor, a three-dimensional point cloud including a plurality of three-dimensional points according to an aspect of the present disclosure includes: obtaining (i) a two-dimensional image obtained by imaging a three-dimensional object using a camera and (ii) a first three-dimensional point cloud obtained by sensing the three-dimensional object using a distance sensor; detecting, from the two-dimensional image in the obtaining, one or more attribute values of the two-dimensional image that are associated with a position in the two-dimensional image; and generating a second three-dimensional point cloud including one or more second three-dimensional points each having an attribute value, by performing, for each of the one or more attribute values detected, (i) identifying, from a plurality of three-dimensional points forming the first three-dimensional point cloud, one or more first three-dimensional points to which the position of the attribute value corresponds, and (ii) appending the attribute value to the one or more first three-dimensional points identified.

A position estimation method for estimating, using a processor, a current position of a moving body according to an aspect of the present disclosure includes: obtaining a three-dimensional point cloud including a plurality of three-dimensional points to each of which a first attribute value is appended in advance, the first attribute value being an attribute value of a first two-dimensional image that is an imaged three-dimensional object; obtaining a second two-dimensional image of a surrounding area of the moving body that has been imaged by a camera included in the moving body; detecting, from the second two-dimensional image obtained, one or more second attribute values of the second two-dimensional image corresponding to a position in the second two-dimensional image; for each of the one or more second attribute values detected, generating one or more combinations formed by the second attribute value and one or more fifth three-dimensional points, by identifying the one or more fifth three-dimensional points associated with the second attribute value from the plurality of three-dimensional points; obtaining, from a memory device, a position and an orientation of the camera with respect to the moving body; and calculating a position and an orientation of the moving body using the one or more combinations generated, and the position and the orientation of the camera obtained.

Note that these general and specific aspects may be implemented as a system, a method, an integrated circuit, a computer program, or may be implemented as a computer-readable recording medium such as a CD-ROM, or as any combination of a system, a method, an integrated circuit, a computer program, or a computer-readable recording medium.

The present disclosure makes further improvement possible.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 12 is a flowchart of an example of an encoding process in detail.

Figure 1:
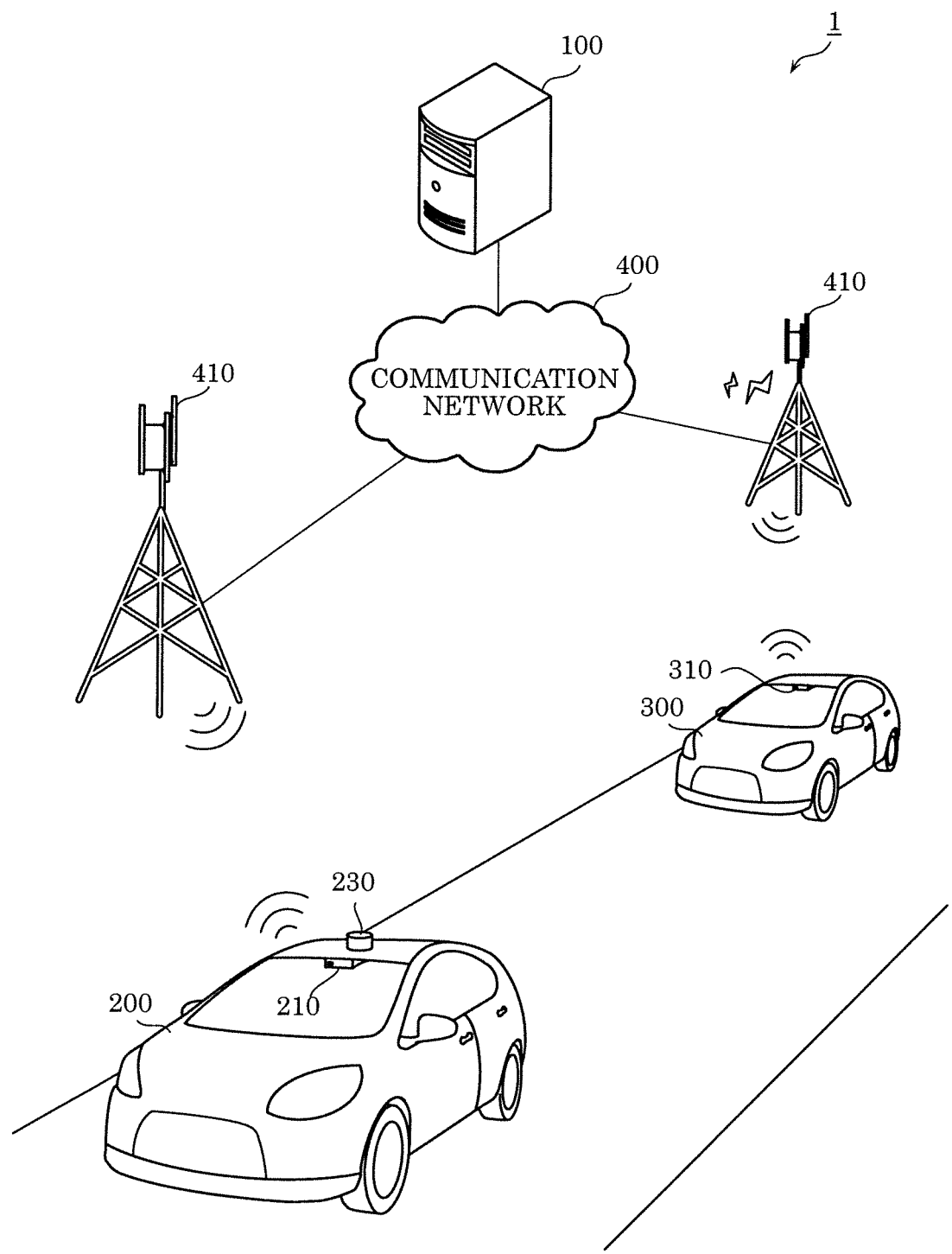
FIG. 1 is a diagram showing an outline of a position estimation system.

DETAILED DESCRIPTION OF THE EMBODIMENT UNDERLYING KNOWLEDGE FORMING BASIS OF PRESENT DISCLOSURE

Three-dimensional point clouds are common in manufacturing and architecture, and has in recent years become essential in information technology applications such as autonomous driving. Three-dimensional point clouds are usually highly inefficient in data storage and data processing. Therefore, generating compactly compressed three-dimensional point cloud data is desirable when using three-dimensional point cloud data in real-life applications. In this manner, being able to reduce the data amount of three-dimensional point cloud data has been considered necessary. Self-location estimation using three-dimensional point cloud data with a reduced data amount has also been considered necessary.

The present disclosure has an object to provide a three-dimensional point cloud generation method and a three-dimensional point cloud generation device capable of effectively reducing the data amount of three-dimensional point cloud data, and a position estimation method and a position estimation device capable of estimating a self-location using three-dimensional point cloud data with a reduced data amount.

A three-dimensional point cloud generation method for generating, using a processor, a three-dimensional point cloud including a plurality of three-dimensional points according to an aspect of the present disclosure includes: obtaining (i) a two-dimensional image obtained by imaging a three-dimensional object using a camera and (ii) a first three-dimensional point cloud obtained by sensing the three-dimensional object using a distance sensor; detecting, from the two-dimensional image in the obtaining, one or more attribute values of the two-dimensional image that are associated with a position in the two-dimensional image; and generating a second three-dimensional point cloud including one or more second three-dimensional points each having an attribute value, by performing, for each of the one or more attribute values detected, (i) identifying, from a plurality of three-dimensional points forming the first three-dimensional point cloud, one or more first three-dimensional points to which the position of the attribute value corresponds, and (ii) appending the attribute value to the one or more first three-dimensional points identified.

With this, the second three-dimensional point cloud is generated including second three-dimensional points, which are the three-dimensional points, among the plurality of three-dimensional points forming the first three-dimensional point cloud obtained using the distance sensor, to which the attribute value is appended of the two-dimensional image corresponding to the position in the two-dimensional image obtained using the camera. Therefore, in the position estimation device that estimates the self-location, it is possible to efficiently estimate the self-location by comparing the attribute value corresponding to the position of the two-dimensional image obtained by imaging with the attribute value appended to each second three-dimensional point of the second three-dimensional point cloud, when imaging a two-dimensional image of a surrounding area of a new self-device, even without sensing a new three-dimensional point cloud.

In the obtaining, a plurality of two-dimensional images may be obtained by imaging using the camera in different positions and/or orientations, the plurality of two-dimensional images each being the two-dimensional image. In the detecting, the one or more attribute values may be detected for each of the plurality of two-dimensional images obtained. The three-dimensional point cloud generation method may further include: matching attribute values associated with two two-dimensional images from the plurality of two-dimensional images using the one or more attribute values detected for each of the plurality of two-dimensional images; and outputting one or more pairs of the attribute values matched. In the identifying, for each of the one or more pairs, the one or more first three-dimensional points, among the plurality of three-dimensional points, to which the position of two attribute values forming the pair in the two-dimensional image correspond may be identified using (i) the position in the two-dimensional image of each of the two attribute values forming the pair, and (ii) positions and/or orientations of the camera when imaging the two two-dimensional images. In the generating, for each of the one or more pairs, the second three-dimensional point cloud may be generated by appending, to the one or more first three-dimensional points identified, an attribute value based on the two attribute values forming the corresponding one of the one or more pairs.

With this, a pair of attribute values is identified by matching the attribute values of two two-dimensional images, three-dimensional points corresponding to a position are identified using a position associated with each two-dimensional image of the pair of attribute values, and the two attribute values forming the pair are appended to the identified three-dimensional points. This makes it possible to identify three-dimensional points associated with the attribute values with high precision.

In the generating, the one or more second three-dimensional points may be generated by appending the one or more attribute values to one of the one or more first three-dimensional points identified.

Since a plurality of attribute values are to be appended to one first three-dimensional point, it is possible to associate the first three-dimensional point with the attribute value of the two-dimensional image associated with a position in the two-dimensional image with high precision, the attribute value to be obtained for performing the position estimation.

The one or more attribute values to be appended to the one of the one or more first three-dimensional points in the generating may each be detected from the plurality of two-dimensional images.

One first three-dimensional point can be imaged from multiple viewpoints. In the position estimation, the two-dimensional image obtained can be imaged from different viewpoints, since the two-dimensional image is imaged at different positions. Therefore, it is possible to easily associate the attribute values obtained from each two-dimensional image with the first three-dimensional points, by appending multiple attribute values detected from multiple two-dimensional images, even when using two-dimensional images imaged at different viewpoints in the position estimation. As such, it is possible to easily perform the position estimation.

The one or more attribute values to be appended to the one of the one or more first three-dimensional points in the generating may each be of a different attribute type.

Since the attribute value to be appended to one first three-dimensional point is set to multiple types of attribute values, it is possible to associate the first three-dimensional point with the attribute value of the two-dimensional image associated with a position in the two-dimensional image with high precision, the attribute value to be obtained for performing the position estimation.

In the detecting, a feature quantity calculated for each of a plurality of areas forming the two-dimensional image obtained may be detected as the one or more attribute values of the two-dimensional image associated with the position in the two-dimensional image.

Therefore, it is possible to easily calculate the feature quantity in the position of the two-dimensional image using a predetermined method.

In the generating, a third three-dimensional point cloud may be further generated including one or more third three-dimensional points each having the attribute value and a degree of importance, by performing, for each of the one or more second three-dimensional points, (i) calculating the degree of importance of the second three-dimensional point based on the attribute value appended to the second three-dimensional point, (ii) and appending the degree of importance calculated to the second three-dimensional point.

Therefore, the client device is capable of, for example, adjusting the data amount of the three-dimensional point cloud data using in the processes the precision of the processes is not impinged upon, since it is possible to preferentially use the third three-dimensional points with a high degree of importance.

One or more fourth three-dimensional points to which the degree of importance exceeding the threshold value received is appended may be extracted from the one or more third three-dimensional points, and a fourth three-dimensional point cloud including the one or more fourth three-dimensional points extracted may be transmitted to the client device.

Therefore, it is possible to adjust the data amount of the three-dimensional point cloud data to be transmitted, in accordance with a request from the client device.

A position estimation method for estimating, using a processor, a current position of a moving body according to an aspect of the present disclosure includes: obtaining a three-dimensional point cloud including a plurality of three-dimensional points to each of which a first attribute value is appended in advance, the first attribute value being an attribute value of a first two-dimensional image that is an imaged three-dimensional object; obtaining a second two-dimensional image of a surrounding area of the moving body that has been imaged by a camera included in the moving body; detecting, from the second two-dimensional image obtained, one or more second attribute values of the second two-dimensional image corresponding to a position in the second two-dimensional image; for each of the one or more second attribute values detected, generating one or more combinations formed by the second attribute value and one or more fifth three-dimensional points, by identifying the one or more fifth three-dimensional points associated with the second attribute value from the plurality of three-dimensional points; obtaining, from a memory device, a position and an orientation of the camera with respect to the moving body; and calculating a position and an orientation of the moving body using the one or more combinations generated, and the position and the orientation of the camera obtained.

This makes it possible to efficiently estimate the self-location by comparing a combination of the second attribute value corresponding to the position of the second two-dimensional image obtained by imaging and the one or more fifth three-dimensional points corresponding to the second attribute value with the first attribute value appended to each three-dimensional point of the three-dimensional point cloud, when imaging the second two-dimensional image of the surrounding area of the new self-device, even without sensing a new three-dimensional point cloud, since the attribute value of the two-dimensional image, which is an imaged three-dimensional object, has been appended to the three-dimensional point cloud in advance.

Note that these general and specific aspects may be implemented as a system, a method, an integrated circuit, a computer program, or may be implemented as a computer-readable recording medium such as a CD-ROM, or as any combination of a system, a method, an integrated circuit, a computer program, or a computer-readable recording medium.

Hereinafter, a three-dimensional point cloud generation method, a position estimation method, a three-dimensional point cloud generation device, and a position estimation device according to an aspect of the present disclosure will be concretely described with reference to the drawings.

Note that the embodiments described below each show a specific example in the present disclosure. Numerical values, shapes, materials, components, placement and connection of the components, steps and orders of the steps, and the like are mere examples and are not intended to limit the present disclosure. Components in the following embodiments not mentioned in any of the independent claims that define the broadest concepts are described as optional elements.

Embodiment 1

An outline of an embodiment will be described first. In the present embodiment, a position estimation system that estimates a self-location of a moving body, such as a vehicle, using three-dimensional point cloud data will be described.

FIG. 1 is an outline of the position estimation system.

FIG. 1 shows three-dimensional point cloud generation device 100, vehicles 200 and 300, communication network 400, and base station 410 of a mobile communication system. For example, position estimation system 1 includes, among these components, three-dimensional point cloud generation device 100, and vehicles 200 and 300. Vehicle 200 and vehicle 300 differ in type from each other. Position estimation system 1 is not limited to including one vehicle 200 and may also include two or more vehicles 200, and similarly, is not limited to including one vehicle 300 and may also include three or more vehicles 300.

Three-dimensional point cloud generation device 100 (i) obtains two-dimensional images imaged by camera 210 included in vehicle 200 and a three-dimensional point cloud obtained through Light Detection and Ranging, Laser Imaging Detection and Ranging (LiDAR) 230 included in vehicle 200, and (ii) generates three-dimensional point cloud data used by vehicle 300 to estimate a self-location of vehicle 300. Three-dimensional point cloud here indicates a three-dimensional point cloud including three-dimensional points to which a feature quantity of a feature point is appended. The three-dimensional points to each of which the feature quantity of the feature point is appended will be described later. Three-dimensional point cloud generation device 100 is, for example, a server.

Vehicle 200 includes camera 210 and LiDAR 230, images a three-dimensional object in a surrounding area of vehicle 200 into a two-dimensional image, and detects a three-dimensional point cloud of the three-dimensional object. The three-dimensional point cloud includes, for example, a plurality of three-dimensional coordinates (X, Y, Z) indicating positions on a surface of the three-dimensional object in the surrounding area of vehicle 200. Vehicle 200, for example, generates a two-dimensional image imaged by camera 210 of vehicle 200 from a position of vehicle 200 at different times, by means of camera 210 imaging at different times while vehicle 200 is driving on a road. In other words, camera 210 images at different times while vehicle 200 moves along a movement path. Therefore, the plurality of two-dimensional images are obtained by imaging using camera 210 in different positions and/or orientations. Vehicle 200, for example, generates a three-dimensional point cloud sensed by LiDAR 230 of vehicle 200 from the position of vehicle 200 at different times, by means of LiDAR 230 sensing at different times while vehicle 200 is driving on the road.

Sensor data obtained LiDAR 230 may be used to identify a position and orientation of camera 210 when the two-dimensional image is imaged. In this case, an accurate three-dimensional map used by a regular vehicle to estimate the self-location of the regular vehicle may be generated using a three-dimensional point cloud obtained by a device other than vehicle 200. The accurate three-dimensional map is an example of a first three-dimensional point cloud and is formed by three-dimensional points. The three-dimensional points may be indicated with a different 3-axis coordinate system than with an X-axis, Y-axis, and Z-axis.

The sensor data obtained by LiDAR 230 may be used to generate the accurate three-dimensional map used by a regular vehicle to estimate the self-location of the regular vehicle. In this case, LiDAR 230 is a distance sensor capable of, for example, more accurately measuring a large number of three-dimensional points than LiDAR used by a regular vehicle for automated driving or driver assistance. In other words, vehicle 200 is a sensing device that obtains a three-dimensional point cloud and two-dimensional images for generating the accurate three-dimensional map used in the self-location estimation.

Note that a timing of the imaging by camera 210 and a timing of the sensing by LiDAR 230 may be synchronized, but do not need to be. The timing of the imaging by camera 210 and the timing of the sensing by LiDAR 230 may be performed with the same timing, and may also be performed with different timings.

Vehicle 300 includes camera 310 and images a three-dimensional object in the surrounding area of vehicle 300 into a two-dimensional image. Vehicle 300 estimates the self-location of vehicle 300 using a two-dimensional image obtained imaging by camera 310 and the three-dimensional point cloud obtained from three-dimensional point cloud generation device 100. Vehicle 300 performs automated driving or driver assistance using an estimation result of the self-location. In other words, vehicle 300 functions as a client device.

Communication network 400 may be a generic network such as the Internet and may also be a dedicated network. Base station 410 is used in, for example, a mobile communication system such as a third generation mobile communication system (3G), fourth generation mobile communication system (4G), LTE®, or fifth generation mobile communication system (5G).

A specific example of a functionality structure of the position estimation system will be described next with reference to FIG. 2.

Figure 2:
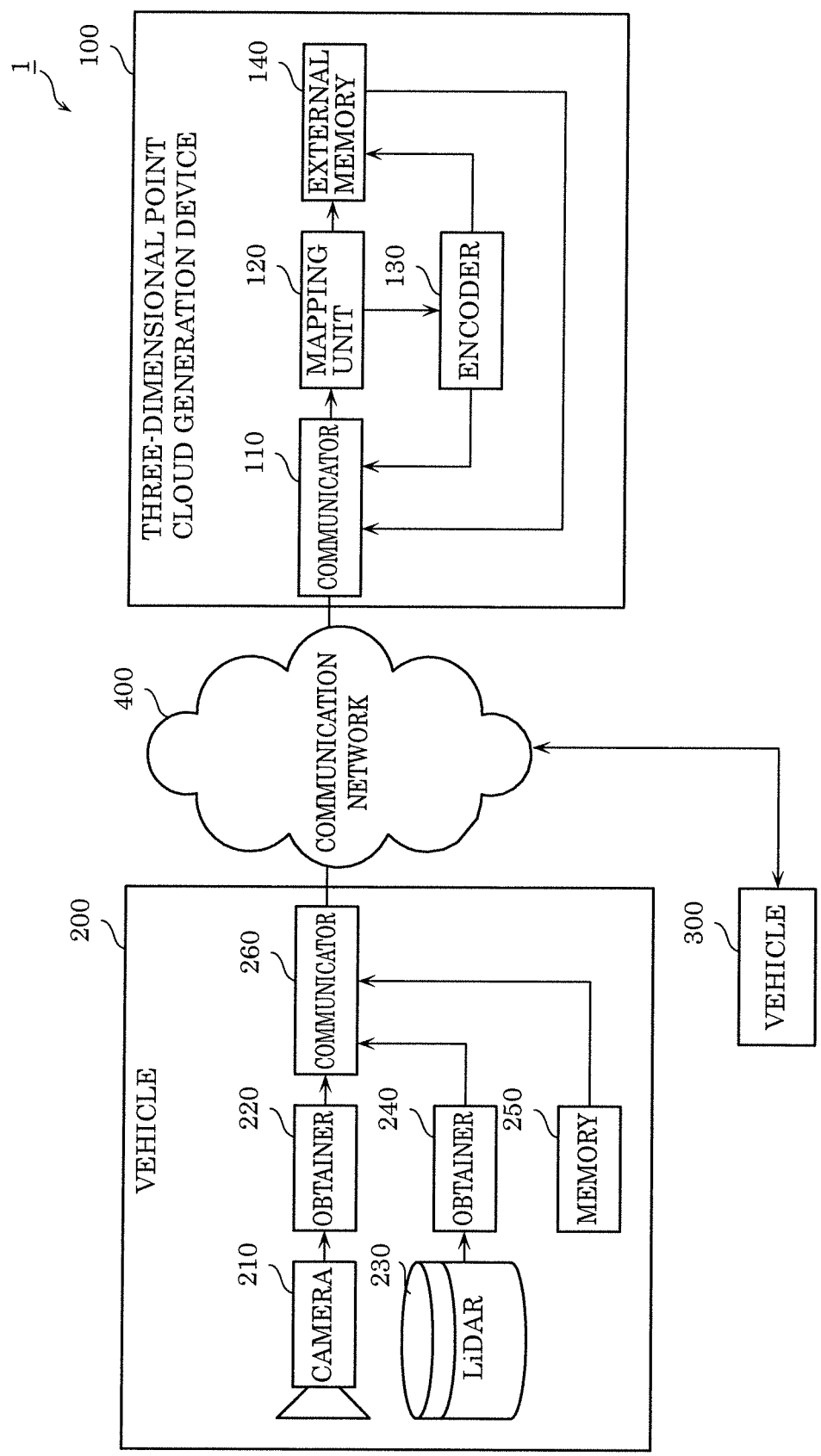
FIG. 2 is a block diagram showing an example of a functionality structure of the position estimation system.

FIG. 2 is a block diagram showing an example of the functionality structure of the position estimation system.

A functionality structure of three-dimensional point cloud generation device 100 will be described first.

Three-dimensional point cloud generation device 100 includes communicator 110, mapping unit 120, encoder 130, and external memory 140.

Communicator 110 communicates with vehicles 200 and 300 via communication network 400. Communicator 110 receives the two-dimensional image and the three-dimensional point cloud from vehicle 200 through communication via communication network 400. Communicator 110 may receive a relative position and orientation of camera 210 with respect to LiDAR 230 from vehicle 200 through communication via communication network 400. Communicator 110 transmits the three-dimensional point cloud to which the feature quantity of the feature point is appended to vehicle 300 through communication via communication network 400. Communicator 110 may transmit the three-dimensional point cloud to which a feature quantity of a feature point is appended to a host server not illustrated through communication via communication network 400.

Note that three-dimensional point cloud generation device 100 may prestore, as a table per vehicle type of vehicle 200 or per vehicle, the relative position and orientation of camera 210 with respect to LiDAR 230 in a non-volatile memory device such as external memory 140. In this case, three-dimensional point cloud generation device 100 may obtain the relative position and orientation of camera 210 with respect to LiDAR 230 in vehicle 200, by identifying the relative position and orientation of camera 210 from the tables stored in the non-volatile memory device, by obtaining information for identifying the vehicle type from vehicle 200 or the vehicle itself.

Note that communicator 110 is implemented through a communication interface capable of being communicably connected to communication network 400. To be specific, communicator 110 is communicably connected to communication network 400 by being communicably connected to base station 410 of the mobile communication system. Communicator 110 may be implemented through a wireless communication interface that conforms to the communication protocols used in a mobile communication system, such as a third generation mobile communication system (3G), fourth generation mobile communication system (4G), LTE®, or fifth generation mobile communication system (5G). Communicator 110 may, for example, be implemented through a wireless local area network (LAN) that conforms to protocols IEEE 802.11a, b, g, n, and ac, and may also be implemented through a communication interface that is communicably connected to communication network 400, by being communicably connected to a router (e.g. mobile wireless LAN router) not illustrated.

Mapping unit 120 performs, using the two-dimensional image and the three-dimensional point cloud obtained by communicator 110, a mapping process of appending an attribute value detected from the two-dimensional image to the three-dimensional points forming the three-dimensional point cloud. The mapping unit will be described in more detail later with reference to FIG. 6 and FIG. 7.

Encoder 130 generates an encoded stream by encoding the three-dimensional point cloud obtained through the mapping process. Encoder 130 may store the generated encoded stream in external memory 140. Encoder 130 may also cause communicator 110 to transmit the generated encoded stream to vehicle 300 via communication network 400. Encoder 130 will be described in more detail later with reference to FIG. 8 and FIG. 9.

Mapping unit 120 and encoder 130 may each be implemented through a processor and memory, and may also be implemented through a dedicated circuit. In other words, mapping unit 120 and encoder 130 may be implemented through software, and may also be implemented through hardware.

External memory 140 may, for example, store information necessary for the processor, such as a computer program. External memory 140 may store data generated through processes of the processor, e.g. the three-dimensional point cloud to which the attribute value has been appended, the encoded stream, etc. External memory 140 is, for example, implemented through a non-volatile memory device, such as flash memory or a hard disk drive (HDD).

Vehicle 200 includes camera 210, obtainer 220, LiDAR 230, obtainer 240, memory 250, and communicator 260.

Camera 210 obtains a two-dimensional image by imaging a three-dimensional object in a three-dimensional space in the surrounding area of vehicle 200. Camera 210 may be disposed in a predetermined position and a predetermined orientation with respect to vehicle 200. For example, camera 210 may be disposed inside vehicle 200 and may also be disposed outside vehicle 200. Camera 210 may image frontward of vehicle 200, leftward or rightward of vehicle 200, rearward of vehicle 200, and may also image a 360-degree radius around vehicle 200. Camera 210 may comprise one camera and may also comprise two or more cameras. Camera 210 may obtain a plurality of two-dimensional images by imaging at different times. Camera 210 may image a moving image at a predetermined frame rate including a plurality of frames as the plurality of two-dimensional images.

Obtainer 220 is disposed to interact with camera 210, stores the two-dimensional images obtained through camera 210 imaging at different times, and outputs the stored two-dimensional images to communicator 260. The two-dimensional images are each associated with a time at which a corresponding two-dimensional image is imaged. Obtainer 220 may be an internal processor of camera 210. In other words, camera 210 may include the functionality of obtainer 220.

LiDAR 230 obtains a three-dimensional point cloud by sensing a three-dimensional object in a three-dimensional space in the surrounding area of vehicle 200. LiDAR 230 is retained in vehicle 200, and is a laser sensor that detects a distance of a three-dimensional object in a detection range of 360 degrees in horizontal direction and a predetermined vertical angle (e.g. 30 degrees) of vehicle 200. LiDAR 230 is an example of a distance sensor. LiDAR 230 measures a distance from LiDAR 230 to the three-dimensional object by emitting laser light in the surrounding area of vehicle 200 and detecting the laser light reflected off of objects in the surrounding area of vehicle 200. For example, LiDAR 230 measures the distance in the order of centimeters. In this manner, LiDAR 230 detects three-dimensional coordinates of each of a plurality of points of a terrain surface of the surrounding area of vehicle 200. In other words, LiDAR 230 detects a three-dimensional shape of a terrain including objects in the surrounding area of vehicle 200, by detecting three-dimensional coordinates of the terrain surface of the surrounding area of vehicle 200. In this manner, LiDAR 230 obtains a three-dimensional point cloud indicating the three-dimensional shape of the terrain including objects in the surrounding area of vehicle 200, the three-dimensional point cloud including the three-dimensional coordinates of the plurality of points. Note that the distance sensor is not limited to LiDAR 230, and may be any other distance sensor such as a millimeter-wave radar, ultrasound sensor, time-of-flight (ToF) camera, or a stereo camera.

Obtainer 240 is disposed to interact with LiDAR 230, stores three-dimensional point clouds obtained through LiDAR 230 imaging at different times, and outputs the stored three-dimensional point clouds to communicator 260. The three-dimensional point clouds are each associated with a time at which a corresponding three-dimensional point cloud is imaged. Obtainer 240 may be an internal processor of LiDAR 230. In other words, LiDAR 230 may include the functionality of obtainer 240.

Memory 250 stores the position and orientation of camera 210 with respect to vehicle 200, and the position and orientation of LiDAR 230 with respect to vehicle 200. Memory 250 may also store the position and orientation of camera 210 with respect to vehicle 200. The relative position and orientation of camera 210 with respect to LiDAR 230 may be detected (i) by matching an intensity of the laser light outputted by LiDAR 230 with the two-dimensional image imaged by camera 210 and including the laser light of LiDAR 230 that has reflected off of the three-dimensional object, and (ii) by using devices aside from camera 210 and LiDAR 230. Memory 250 is, for example, implemented through a non-volatile memory device.

Communicator 260 communicates with three-dimensional point cloud generation device 100 via communication network 400. Communicator 260 transmits the two-dimensional image and the three-dimensional point cloud to three-dimensional point cloud generation device 100 through communication via communication network 400. Communicator 260 may transmit the relative position and orientation of camera 210 with respect to LiDAR 230 to three-dimensional point cloud generation device 100 through communication via communication network 400.

Note that communicator 260 is implemented through a communication interface capable of being communicably connected to communication network 400. To be specific, communicator 260 is communicably connected to communication network 400 by being communicably connected to base station 410 of the mobile communication system. Communicator 260 may be implemented through a wireless communication interface that conforms to the communication protocols used in a mobile communication system, such as a third generation mobile communication system (3G), fourth generation mobile communication system (4G), LTE®, or fifth generation mobile communication system (5G).

A functionality structure of vehicle 300 will be described next.

Figure 3:
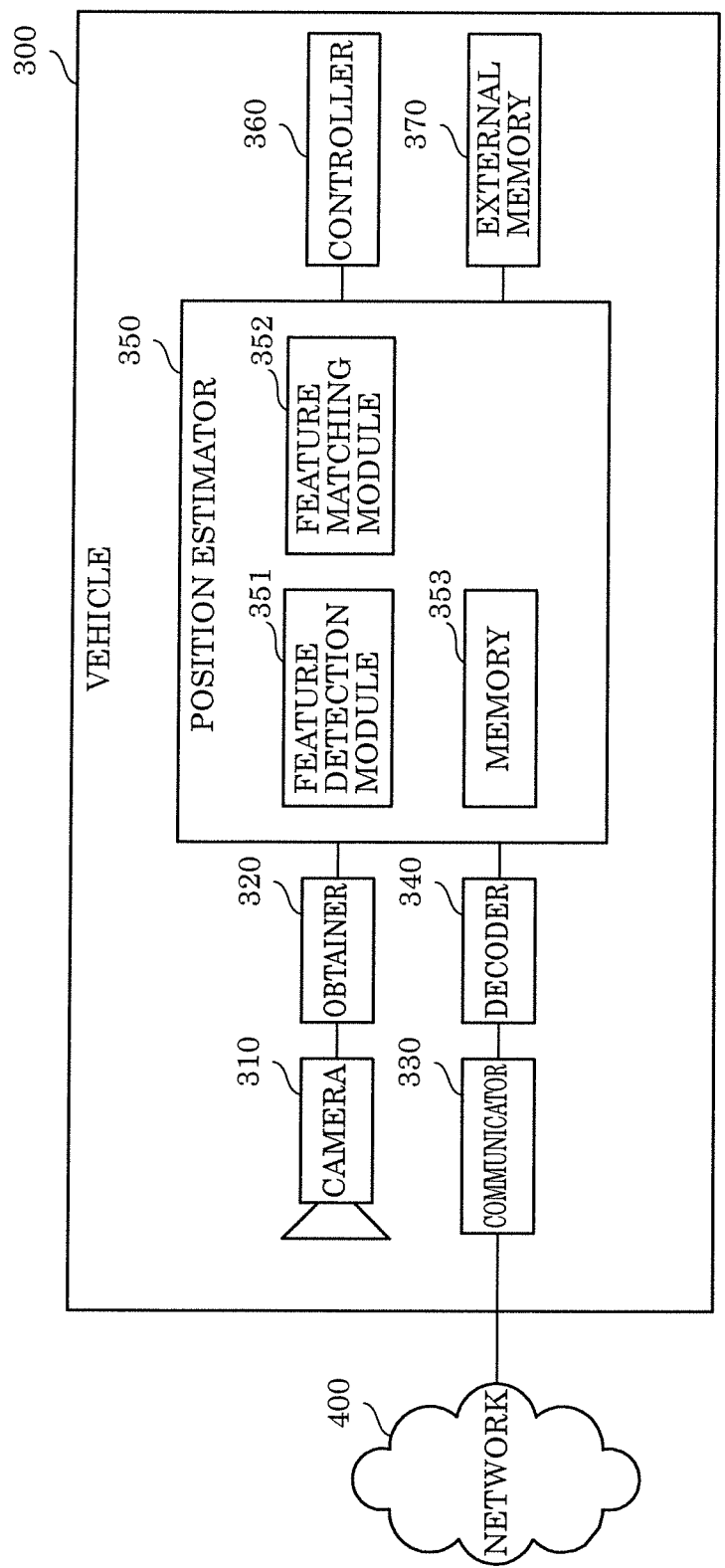
FIG. 3 is a block diagram showing an example of a functionality structure of a vehicle serving as a client device.

FIG. 3 is a block diagram showing an example of a functionality structure of a vehicle serving as a client device.

Vehicle 300 includes camera 310, obtainer 320, communicator 330, decoder 340, position estimator 350, controller 360, and external memory 370.

Camera 310 is disposed in a predetermined position and a predetermined orientation with respect to vehicle 300, and images a three-dimensional object in a three-dimensional space in the surrounding area of vehicle 300. Camera 310 differs from camera 210 in that camera 310 is disposed in vehicle 300, but since camera 310 has the same structure as camera 210 otherwise, camera 310 can be described by reading camera 210 as camera 310, and vehicle 200 as vehicle 300. Therefore, detailed description of camera 310 is omitted.

Obtainer 320 is disposed to interact with camera 310, stores the two-dimensional image obtained through imaging performed by camera 310, and outputs the stored two-dimensional image to position estimator 350. Obtainer 320 may be an internal processor of camera 310. In other words, camera 310 may include the functionality of obtainer 320.

Communicator 330 communicates with three-dimensional point cloud generation device 100 via communication network 400. Communicator 330 receives an encoded stream from three-dimensional point cloud generation device 100 by receiving the encoded stream through communication via communication network 400. Communicator 330 may transmit a threshold value relating to a degree of importance, which will be described later, to three-dimensional point cloud generation device 100 via communication network 400, in order to reduce a communication load.

Communicator 330 may obtain all of the three-dimensional points included in the three-dimensional point cloud included in three-dimensional point cloud generation device 100. Note that when obtaining the three-dimensional point cloud from three-dimensional point cloud generation device 100, communicator 330 may obtain, as all of the above three-dimensional points, a three-dimensional point cloud of a predetermined area having a position of vehicle 300 detected by a coarse-precision position detection device such as the Global Positioning System (GPS), which is not illustrated, as reference. This makes it possible to reduce a data amount of the three-dimensional point cloud to be obtained without having to obtain a three-dimensional point cloud of a surrounding area of a movement path of a moving body. Communicator 330 does not need to obtain all of the three-dimensional points, and may also obtain three-dimensional points having a higher degree of importance than the threshold value and not obtain three-dimensional points having a degree of importance not exceeding the threshold value, among the above three-dimensional points, by transmitting the above threshold value to three-dimensional point cloud generation device 100.

Note that communicator 330 is implemented through a communication interface capable of being communicably connected to communication network 400. To be specific, communicator 330 is communicably connected to communication network 400 by being communicably connected to base station 410 of the mobile communication system. Communicator 330 may be implemented through a wireless communication interface that conforms to the communication protocols used in a mobile communication system, such as a third generation mobile communication system (3G), fourth generation mobile communication system (4G), LTE®, or fifth generation mobile communication system (5G).

Decoder 340 generates the three-dimensional point cloud to which an attribute value is appended, by decoding the encoded stream obtained by communicator 330.

Position estimator 350 estimates, using the two-dimensional image obtained by camera 310 and the three-dimensional point cloud obtained through the decoding by decoder 340 and to which the attribute value is appended, the position and orientation of vehicle 300 by estimating the position and orientation of camera 310 in the three-dimensional point cloud.

Controller 360 controls an operation of vehicle 300. To be specific, controller 360 performs automated driving or driver assistance of vehicle 300 by controlling steering in which wheels are turned, a power source such as an engine or motor that drives the rotation of the wheels, breaking in which the wheels are stopped, etc. For example, controller 360 determines a path indicating on which road vehicle 300 travels, using a current position of vehicle 300, a destination of vehicle 300, and road information of the surrounding area. Controller 360 controls the steering, power source, and breaking so that vehicle 300 travels the determined path.

Decoder 340, position estimator 350, and controller 360 may each be implemented through a processor, and may also be implemented through a dedicated circuit. In other words, decoder 340, position estimator 350, and controller 360 may be implemented through software, and may also be implemented through hardware.

External memory 370 may, for example, store information necessary for the processor, such as a computer program. External memory 370 may store data generated through the processes of the processor, e.g. the three-dimensional point cloud to which the attribute value has been appended, the encoded stream, etc. External memory 370 is, for example, implemented through a non-volatile memory device, such as flash memory or a hard disk drive (HDD).

An operation of position estimation system 1 will be described next.

Figure 4:
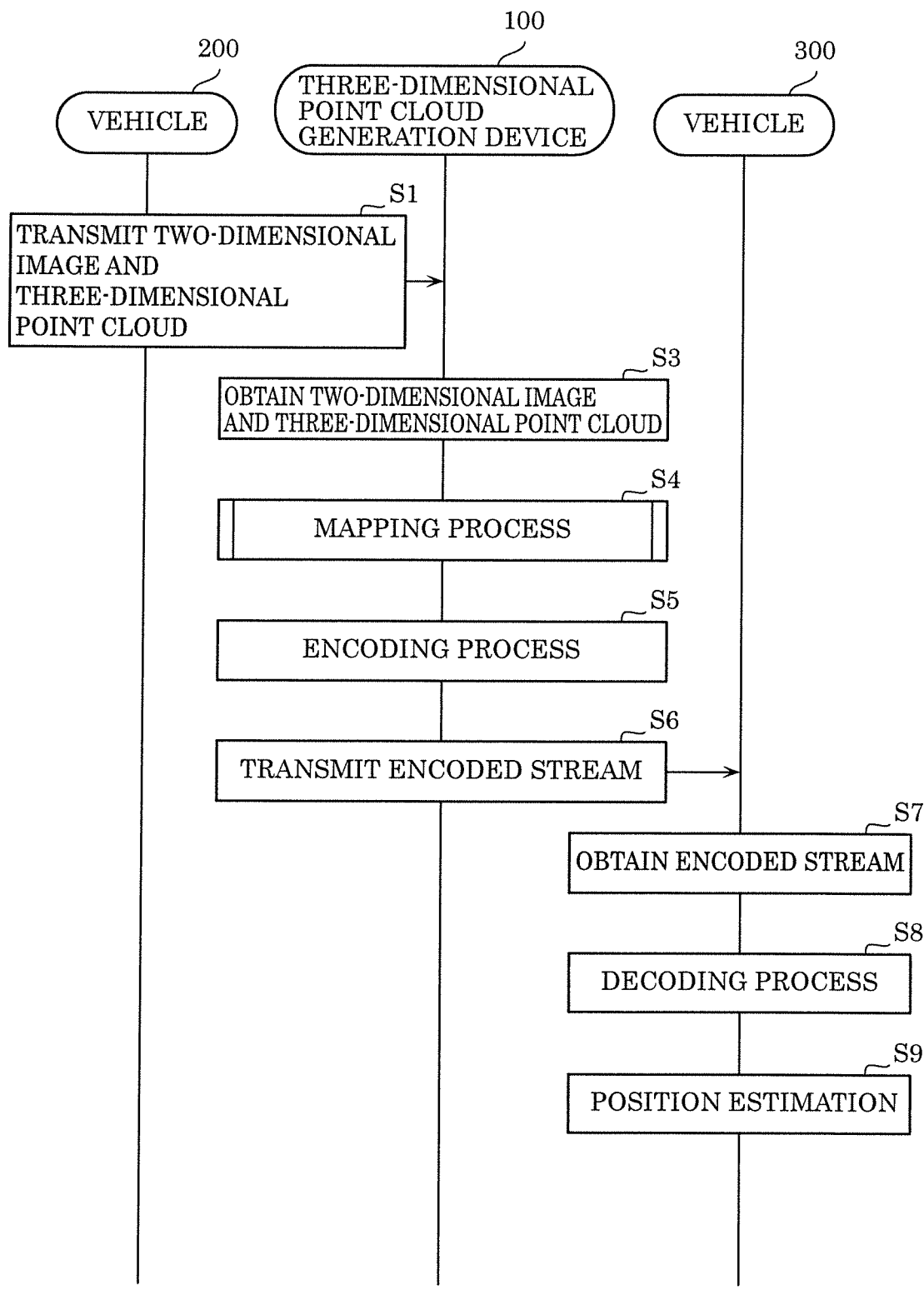
FIG. 4 is a sequence diagram showing an example of an operation of the position estimation system.
Figure 5:
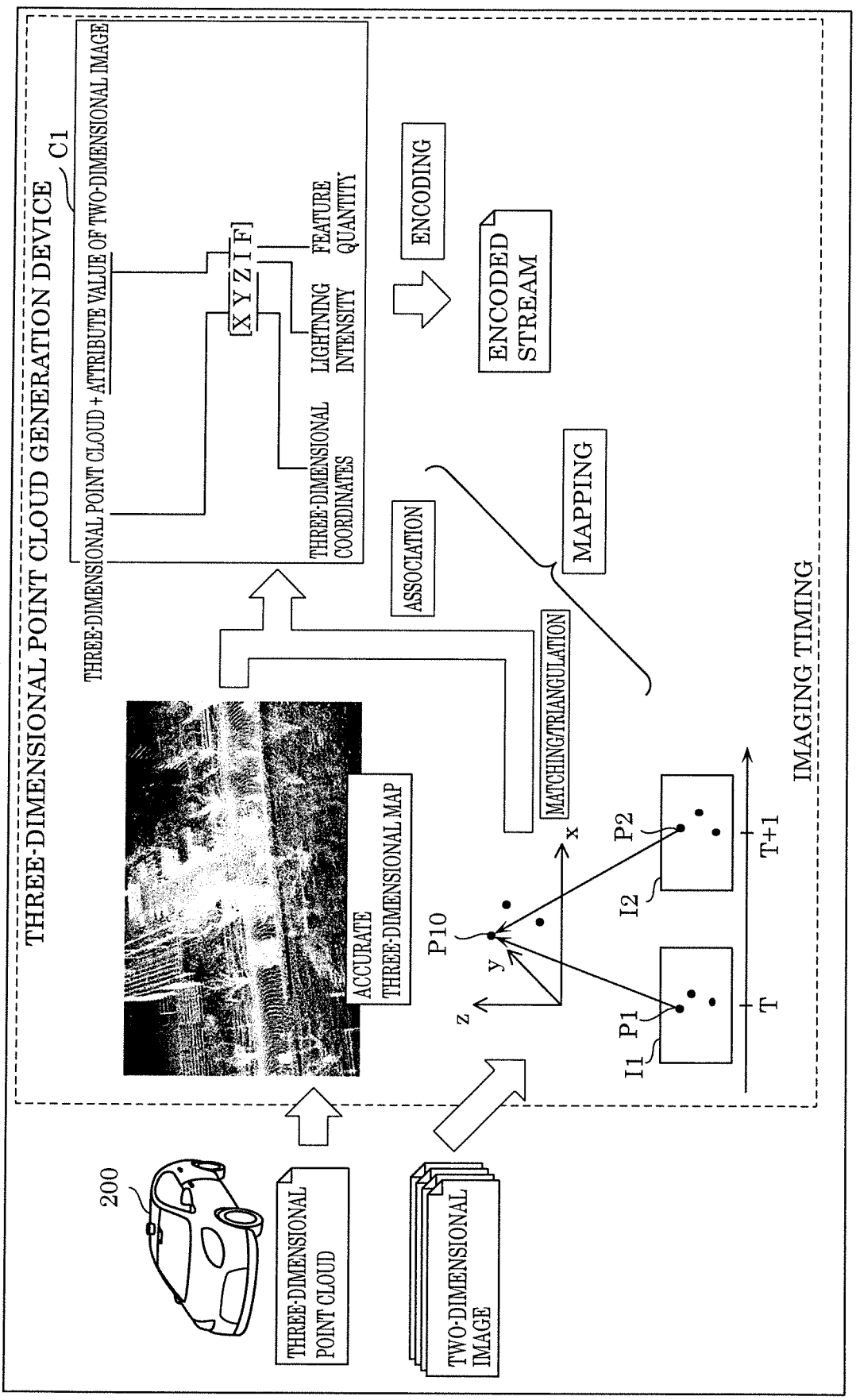
FIG. 5 is a diagram for describing the operation of the position estimation system.

FIG. 4 is a sequence diagram showing an example of the operation of the position estimation system. FIG. 5 is a diagram for describing the operation of the position estimation system.

Vehicle 200 first transmits, to three-dimensional point cloud generation device 100 via communication network 400, (i) the two-dimensional image obtained by means of camera 210 imaging the three-dimensional object in the three-dimensional space of the surrounding area of vehicle 200, and (ii) the three-dimensional point cloud obtained by means of LiDAR 230 sensing the three-dimensional object in the three-dimensional space of the surrounding area of vehicle 200 (S1). Note that detailed processes in vehicle 200 have already been described with reference to FIG. 2, and will thus be omitted.

In three-dimensional point cloud generation device 100, communicator 110 next obtains the two-dimensional image and the three-dimensional point cloud from vehicle 200 via communication network 400 (S3).

Mapping unit 120 then performs, using the two-dimensional image and the three-dimensional point cloud obtained by communicator 110, a mapping process of appending an attribute value detected from the two-dimensional image to the three-dimensional points forming the three-dimensional point cloud (S4).

The mapping process will be described in more detail later along with the detailed structure of mapping unit 120 with reference to FIG. 6 and FIG. 7.

Figure 6:
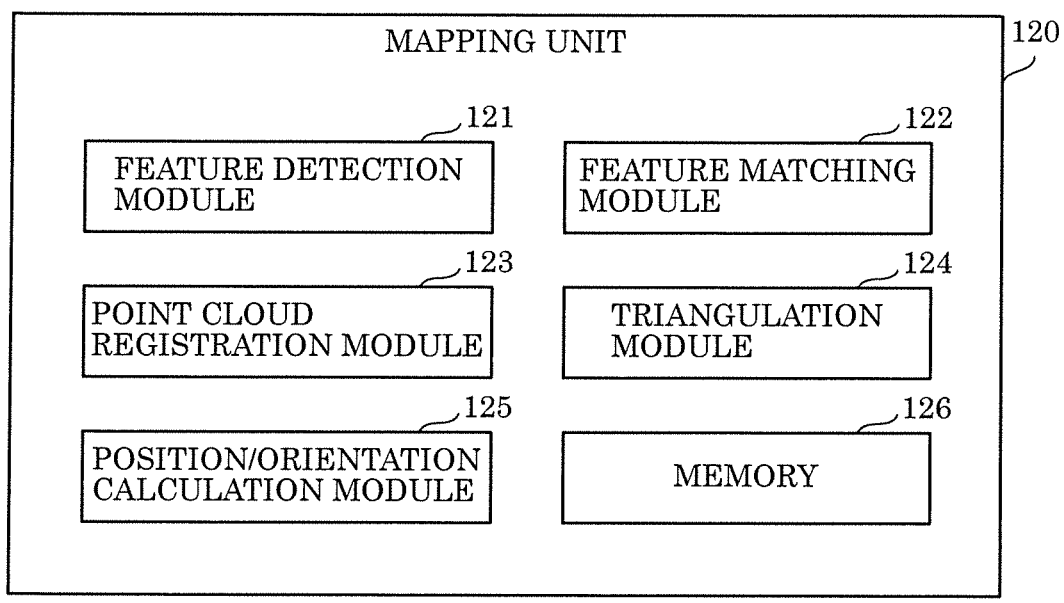
FIG. 6 is a block diagram showing an example of a functionality structure of a mapping unit.
Figure 7:
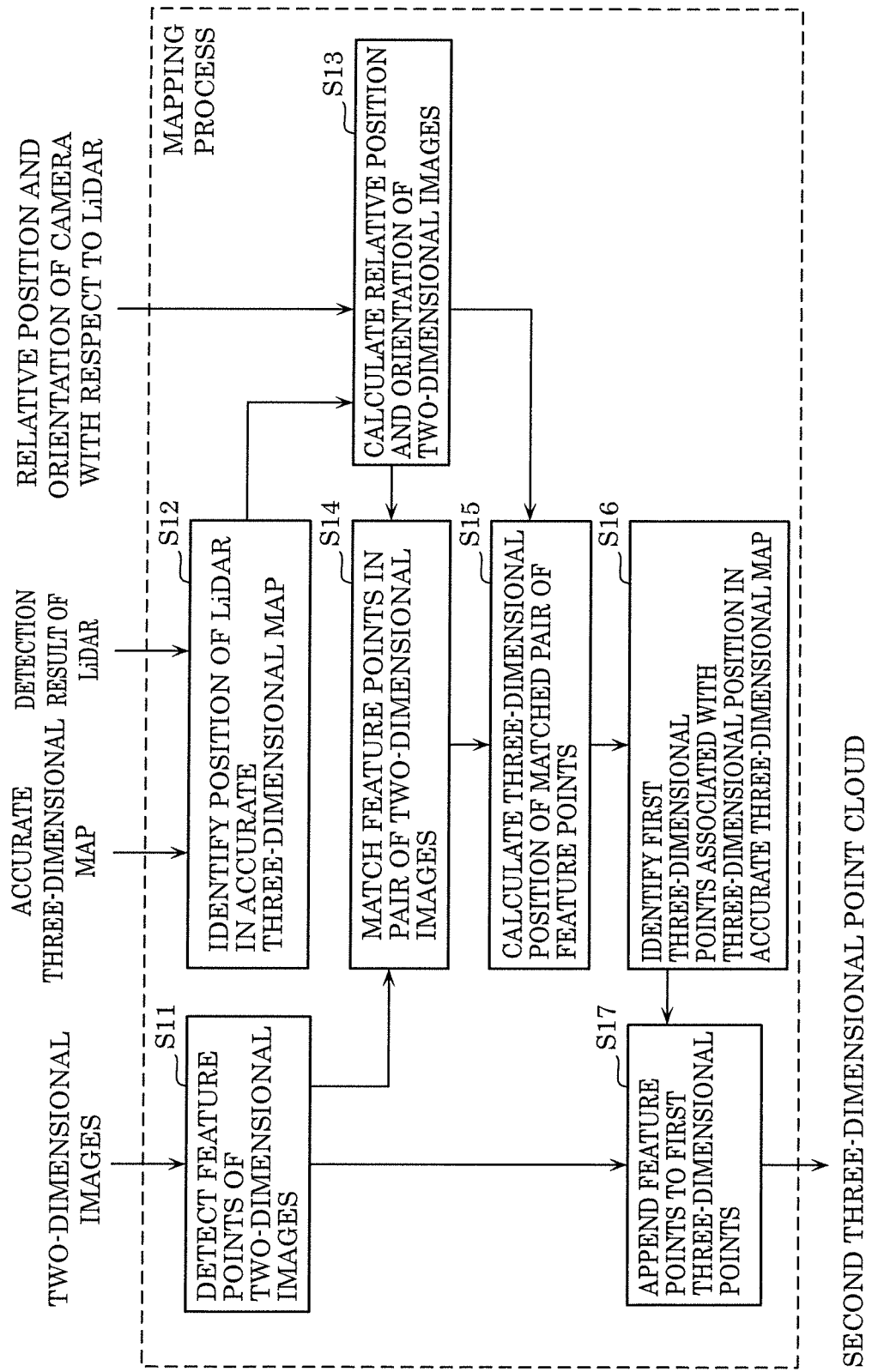
FIG. 7 is a flowchart of an example of a mapping process in detail.

FIG. 6 is a block diagram showing an example of a functionality structure of the mapping unit. FIG. 7 is a flowchart of an example of the mapping process in detail.

As illustrated in FIG. 6, mapping unit 120 includes feature detection module 121, feature matching module 122, point cloud registration module 123, triangulation module 124, position/orientation calculation module 125, and memory 126.

Mapping unit 120 will be described on the condition that the two-dimensional image and the three-dimensional point cloud are inputted to mapping unit 120, the three-dimensional point cloud being sensed with a timing associated with the timing of the imaging of the two-dimensional image. In other words, mapping unit 120 associates the two-dimensional image with the three-dimensional point cloud and performs the mapping process, the two-dimensional image being imaged and the three-dimensional point cloud being sensed with timings associated with each other. Note that the three-dimensional point cloud, which is obtained with the timing of the imaging of the two-dimensional image, may be sensed with a timing closest to the timing at which a corresponding two-dimensional image is imaged, and may also be a newest three-dimensional point cloud sensed before the timing at which the corresponding two-dimensional image is imaged. The two-dimensional image and the three-dimensional point cloud obtained with timings associated with each other may be obtained with same timing, when the timing of the imaging by camera 210 and the timing of the sensing by LiDAR 230 are synchronized.

Feature detection module 121 detects a feature point of each of the two-dimensional images obtained by communicator 110 (S11). Feature detection module 121 detects a feature quantity in the feature point. The feature quantity is, for example, oriented FAST and rotated BRIEF (ORB), scale-invariant feature transform (SIFT), DAISY, etc. The feature quantity may also be expressed with a 256-bit data string. A luminance value of each pixel in the two-dimensional image may be used for the feature quantity, and a color expressed with an RGB value and the like may also be used for the feature quantity. The feature quantity of the feature point is an example of the attribute value of the two-dimensional image associated with a position in the two-dimensional image. The feature quantity is not limited to being the feature quantity of the feature point as long as the feature quantity is associated with the position in the two-dimensional image, and may also be calculated per area. The areas form the two-dimensional image, and each area may be one pixel of the two-dimensional image and may also be a block formed by a set of pixels.

Position/orientation calculation module 125 obtains the accurate three-dimensional map from memory 126 or external memory 140, and identifies the position and orientation of LiDAR 230 in the accurate three-dimensional map, using the obtained accurate three-dimensional map and the three-dimensional point cloud obtained by communicator 110, i.e., the three-dimensional point cloud being a detection result of LiDAR 230. Position/orientation calculation module 125, for example, matches the three-dimensional point cloud being the detection result of LiDAR 230 with the three-dimensional point cloud forming the accurate three-dimensional map, using a pattern matching algorithm such as iterative closest point (ICP). With this, position/orientation calculation module 125 identifies the position and orientation of LiDAR 230 in the accurate three-dimensional map. Note that position/orientation calculation module 125 may obtain the accurate three-dimensional map from a host server outside of three-dimensional point cloud generation device 100.

Position/orientation calculation module 125 next obtains the position and orientation of LiDAR 230 in the accurate three-dimensional map and the relative position and orientation of camera 210 with respect to LiDAR 230 stored in memory 250. Position/orientation calculation module 125 then calculates the position and orientation of camera 210 with the timing at which each of the two-dimensional images is imaged, using the position and orientation of LiDAR 230 in the accurate three-dimensional map and the relative position and orientation of camera 210 with respect to LiDAR 230 stored in memory 250 (S13).

Feature matching module 122 next matches the feature points in a pair of the two-dimensional images, i.e., two two-dimensional images, using the feature point of each of the two-dimensional images detected in feature detection module 121 and the position and orientation of camera 210 at different timings at which the two-dimensional images are imaged (S14). As illustrated with "MATCHING/TRIANGULATION" in FIG. 5, for example, feature matching module 122 matches feature point P1 among feature points detected by feature detection module 121 in two-dimensional image I1 imaged by camera 210 with timing T with feature point P2 among feature points detected in two-dimensional image I2 imaged by camera 210 with timing T+1 after timing T. For example, timing T+1 may also be the next imaging timing after timing T. With this, feature matching module 122 associates, between different two-dimensional images, the feature points detected in each of the two-dimensional images. In this manner, feature matching module 122 matches feature points associated with two two-dimensional images from the plurality of two-dimensional images using the plurality of attribute values detected for each of the plurality of two-dimensional images, and outputs a plurality of pairs of the attribute values matched.

Regarding each of the pairs of feature points matched in feature matching module 122, triangulation module 124 next calculates a three-dimensional position associated with the position of the matched feature points in the pair of two-dimensional images, through, for example, triangulation, using the position of each of the two feature points forming the pair in the two-dimensional image, and the position and orientation of camera 210 when each of the two two-dimensional images, in which the pair of feature points have been obtained, are imaged (S15). As illustrated with "MATCHING/TRIANGULATION" in FIG. 5, triangulation module 124, for example, calculates three-dimensional position P10 by triangulating feature point P1 detected in two-dimensional image I1 and feature point P2 detected in two-dimensional image I2. The position and orientation of camera 210 used here is the position and orientation of camera 210 when each of the two-dimensional images, in which the pair of feature points has been obtained, is imaged.

Point cloud registration module 123 next identifies first three-dimensional points, which are associated with the three-dimensional position calculated in triangulation module 124, from three-dimensional points forming the first three-dimensional point cloud as the accurate three-dimensional map (S16). Point cloud registration module 123 may, for example, identify, from the three-dimensional points forming the first three-dimensional point cloud, three-dimensional points closest to one three-dimensional position as the first three-dimensional points. Point cloud registration module 123 may, for example, identify, from the three-dimensional points forming the first three-dimensional point cloud, one or more three-dimensional points within a predetermined range having one three-dimensional position as reference as the first three-dimensional points. In other words, point cloud registration module 123 may identify, as the first three-dimensional points associated with one three-dimensional position, three-dimensional points having the one three-dimensional position as reference and satisfying a predetermined condition.

Point cloud registration module 123 next generates the second three-dimensional point cloud including the second three-dimensional points, by appending each of the two feature quantities forming the pair to the identified first three-dimensional points for each of the plurality of pairs (S17). Note that point cloud registration module 123 may (i) generate the second three-dimensional point cloud by appending one of the two feature quantities forming the pair to the identified first three-dimensional points regarding each of multiple pairs, and (ii) generate the second three-dimensional point cloud by appending one feature quantity calculated from the two feature quantities of the two feature points forming the pair to the identified first three-dimensional points regarding each of multiple pairs. In other words, point cloud registration module 123 may generate the second three-dimensional point cloud by appending a feature quantity based on multiple feature quantity pairs to the identified first three-dimensional points. Note that one feature quantity calculated from the two feature quantities is, for example, an average value. Note that since "feature quantity" here is an example of the attribute value, another attribute value may also be applied in the processes in point cloud registration module 123.

As illustrated with "ASSOCIATION" in FIG. 5, for example, in steps S16 and S17, point cloud registration module 123 performs an association in which the feature quantity of each of feature points P1 and P2 associated with three-dimensional position P10 is appended to a three-dimensional point in the accurate three-dimensional map that is associated with three-dimensional position P10, by identifying the three-dimensional point associated with three-dimensional position P10 obtained by triangulation module 124. With this, as illustrated in FIG. 5, three-dimensional point cloud C1 including three-dimensional points to each of which feature points P1 and P2 are appended is generated. In other words, the three-dimensional points included in three-dimensional point cloud C1 to which the attribute value is appended is formed by three-dimensional coordinates, a lightning intensity (luminance), and a feature quantity of feature points P1 and P2 in each two-dimensional image as the attribute value. In other words, not only the feature quantities of the feature points are appended to the three-dimensional points, but an attribute value such as the lightning intensity (luminance) or an RGB value of the feature points in the two-dimensional image may also be appended.

Note that point cloud registration module 123 may generate a second three-dimensional point by appending multiple attribute values to one first three-dimensional point. As stated above, point cloud registration module 123 may, for example, append the feature quantity of each of the feature points detected from each of the two-dimensional images to one first three-dimensional point. Point cloud registration module 123 may also append attribute values of different types to one first three-dimensional point as multiple attribute values.

Note that memory 126 may store the accurate three-dimensional map. Memory 126 may prestore the accurate three-dimensional map, and may also store the accurate three-dimensional map received from a host server through communicator 110. Memory 126 is, for example, implemented through a non-volatile memory device, such as flash memory or a hard disk drive (HDD).

In this manner, point cloud registration module 123 generates the second three-dimensional point cloud including the second three-dimensional points being the three-dimensional points to which the feature quantities of the feature points are appended, by performing the mapping process of step S4.

Returning to FIG. 4, after step S4, encoder 130 generates an encoded stream by encoding the second three-dimensional point cloud generated in mapping unit 120 (S5).

Communicator 110 then transmits the encoded stream generated in encoder 130 to vehicle 300 (S6).

In vehicle 300, communicator 330 obtains the encoded stream from three-dimensional point cloud generation device 100 (S7).

Decoder 340 next obtains the second three-dimensional point cloud by decoding the encoded stream obtained in communicator 330 (S8). In other words, vehicle 300 obtains a three-dimensional point cloud including a plurality of three-dimensional points to each of which an attribute value is appended in advance, the attribute value being an attribute value of a two-dimensional image that is an imaged three-dimensional object.

Position estimator 350 next estimates, using the two-dimensional image obtained by camera 310 and the three-dimensional point cloud obtained through the decoding in decoder 340 and to which the attribute value is appended, the position and orientation of vehicle 300 by estimating the position and orientation of camera 310 in the three-dimensional point cloud (S9).

A position estimation process performed by position estimator 350 will be described in detail.

As illustrated in FIG. 3, position estimator 350 includes feature detection module 351, feature matching module 352, and memory 353.

Feature detection module 351 obtains a second two-dimensional image of a surrounding area of vehicle 300 that has been imaged by camera 310 included in vehicle 300. Feature detection module 351 then detects, from the second two-dimensional image obtained, a plurality of second attribute values of the second two-dimensional image corresponding to a position in the second two-dimensional image. The processes in feature detection module 351 are similar to the processes in feature detection module 121 of mapping unit 120 in vehicle 200. Note that the processes in feature detection module 351 do not need to be the same as the processes in feature detection module 121 of mapping unit 120. For example, when multiple types of first attribute values are detected as the attribute value in feature detection module 121, feature detection module 351 may detect one or more types of attribute values included in the multiple types of attribute values as the second attribute value.

For each of the one or more second attribute values detected by feature detection module 351, feature matching module 352 next generates one or more combinations formed by the second attribute value and one or more fifth three-dimensional points, by identifying the one or more fifth three-dimensional points associated with the second attribute values from the plurality of second three-dimensional points. To be specific, feature matching module 352 identifies, regarding each of two-dimensional positions in a two-dimensional image associated with each of the attribute values detected by feature detection module 351, one or more second three-dimensional points, among the second three-dimensional points, to which an attribute value is appended that is closest to the attribute value associated with a corresponding two-dimensional position, as fifth three-dimensional points. With this, feature matching module 352 generates one or more combinations formed by the two-dimensional position in the two-dimensional image and one or more fifth three-dimensional points. Feature matching module 352 obtains the position and orientation of camera 310 with respect to vehicle 300 from memory 353. Feature matching module 352 calculates a position and an orientation of vehicle 300 using the one or more combinations generated, and the position and the orientation of camera 310 obtained. Note that feature matching module 352 is capable of calculating the position and orientation of vehicle 300 with high precision with an increase in combinations generated.

Memory 353 may store the position and orientation of camera 310 with respect to vehicle 300. Memory 353 may store the second three-dimensional point cloud obtained through the decoding performed by decoder 340. Memory 353 is, for example, implemented through a non-volatile memory device, such as flash memory or a hard disk drive (HDD).

In the three-dimensional point cloud generation method according to the present embodiment, three-dimensional point cloud generation device 100 generates the second three-dimensional point cloud including second three-dimensional points, which are the three-dimensional points, among the plurality of three-dimensional points forming the first three-dimensional point cloud obtained using the distance sensor, to which the feature quantity of the feature point is appended as the attribute value of the two-dimensional image corresponding to the position in the two-dimensional image obtained using camera 210. Therefore, vehicle 300, serving as a position estimation device that estimates its self-location, is capable of estimating its self-location with high precision, by comparing a feature quantity of a feature point associated with a position of the two-dimensional image obtained through the imaging with the feature quantity of the feature point appended to each of the second three-dimensional points of the second three-dimensional point cloud obtained from three-dimensional point cloud data generating device 100, even when a three-dimensional object is not sensed by LiDAR 230 in the surrounding area of vehicle 300, when imaging a two-dimensional image of a three-dimensional object in the surrounding area of vehicle 300 using camera 210.

In the three-dimensional point cloud generation method according to the present embodiment, a pair of feature points is identified by matching the feature points of two two-dimensional images, three-dimensional points corresponding to a position are identified using a position associated with each two-dimensional image of the pair of feature points, and the feature quantity of the two feature points forming the pair are appended to the identified three-dimensional points. This makes it possible to identify three-dimensional points associated with the feature points with high precision.

In the three-dimensional point cloud generation method according to the present embodiment, in the generating of the second three-dimensional point cloud, the second three-dimensional points are generated by appending the plurality of attribute values to one first three-dimensional points identified. In this manner, since multiple feature points are appended to one first three-dimensional point, it is possible to associate the first three-dimensional point with the feature point of the two-dimensional image associated with a position in the two-dimensional image with high precision, the feature point being obtained for performing the position estimation in vehicle 300.

In the three-dimensional point cloud generation method according to the present embodiment, the plurality of attribute values to be appended to the first three-dimensional points in the generating of the second three-dimensional point cloud are each detected from the plurality of two-dimensional images. One first three-dimensional point here is a point that can be imaged from multiple viewpoints. In the position estimation in vehicle 300, camera 310 images the two-dimensional image at different positions. Therefore, the two-dimensional image obtained by camera 310 is imaged from different viewpoints. This makes it is possible to easily associate the attribute values obtained from each two-dimensional image with the first three-dimensional points, by appending multiple attribute values detected from multiple two-dimensional images, even when using two-dimensional images imaged at different viewpoints in the position estimation. As such, it is possible to easily perform the position estimation.

In the three-dimensional point cloud generation method according to the present embodiment, the plurality of attribute values to be appended to the first three-dimensional points in the generating of the second three-dimensional point cloud are attribute values are each of a different attribute value type. In this manner, since the attribute value to be appended to one first three-dimensional point is set to multiple types of attribute values here, it is possible to associate the first three-dimensional point with the attribute value of the two-dimensional image associated with a position in the two-dimensional image with high precision, the attribute value being obtained for performing the position estimation in vehicle 300.

The position estimation method according to the present embodiment makes it possible to efficiently estimate the self-location of vehicle 300 by comparing a combination of the second attribute value corresponding to the position of the second two-dimensional image obtained by imaging and the one or more fifth three-dimensional points corresponding to the second attribute value with the first attribute value appended to each three-dimensional point of the three-dimensional point cloud, when imaging the second two-dimensional image of the surrounding area of a new vehicle 300, even without sensing a new three-dimensional point cloud, since the attribute value of the two-dimensional image, which is an imaged three-dimensional object, has been appended to the three-dimensional point cloud in advance.

VARIATIONS

Variation 1

In three-dimensional point cloud generation device 100 according to the above embodiment, a degree of importance may be further calculated with respect to each of the second three-dimensional points included in the second three-dimensional point cloud, the calculated degree of importance may be appended to a corresponding second three-dimensional point, and a third three-dimensional point cloud may be generated including third three-dimensional points obtained through the appending. Three-dimensional point cloud generation device 100 may narrow down a total number of the third three-dimensional points to be transmitted to vehicle 300 among the third three-dimensional points included in the third three-dimensional point cloud in accordance with the appended degree of importance, and the narrowed down total number of third three-dimensional points may be transmitted to vehicle 300.

Figure 8:
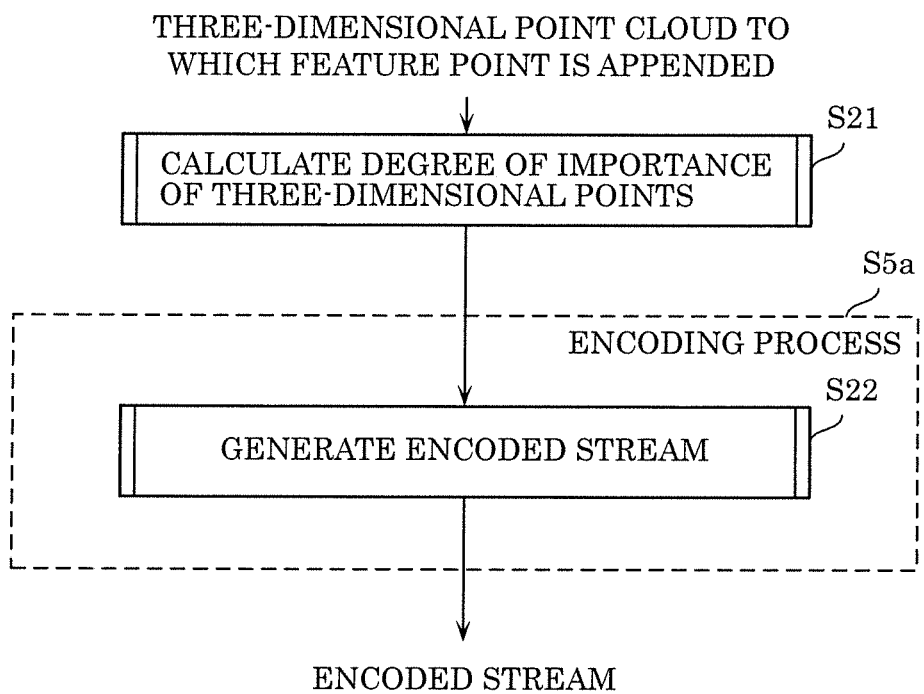
FIG. 8 is a flowchart of an example of an operation of a three-dimensional point cloud generation device according to Variation 1.

An operation will be described with reference to FIG. 8. FIG. 8 is a flowchart of an example of an operation of the three-dimensional point cloud generation device according to Variation 1. This operation is performed instead of step S5 in the sequence diagram of FIG. 4.

In three-dimensional point cloud generation device 100, point cloud registration module 123 of mapping unit 120 further calculates, regarding each of one or more second three-dimensional points, a degree of importance of a corresponding second three-dimensional point based on an attribute value appended to the corresponding second three-dimensional point (S21). Point cloud registration module 123 then further generates a third three-dimensional point cloud including one or more three-dimensional points each having the attribute value and a degree of importance, by appending, for each of the one or more second three-dimensional points, the degree of importance calculated to the second three-dimensional points. A calculation process of the degree of importance will be described in more detail later with reference to FIG. 9.

Encoder 130 of three-dimensional point cloud generation device 100 next generates an encoded stream using the third three-dimensional point cloud (S22). A generation process of the encoded stream will be described in more detail later with reference to FIG. 10 and FIG. 11.

Figure 9:
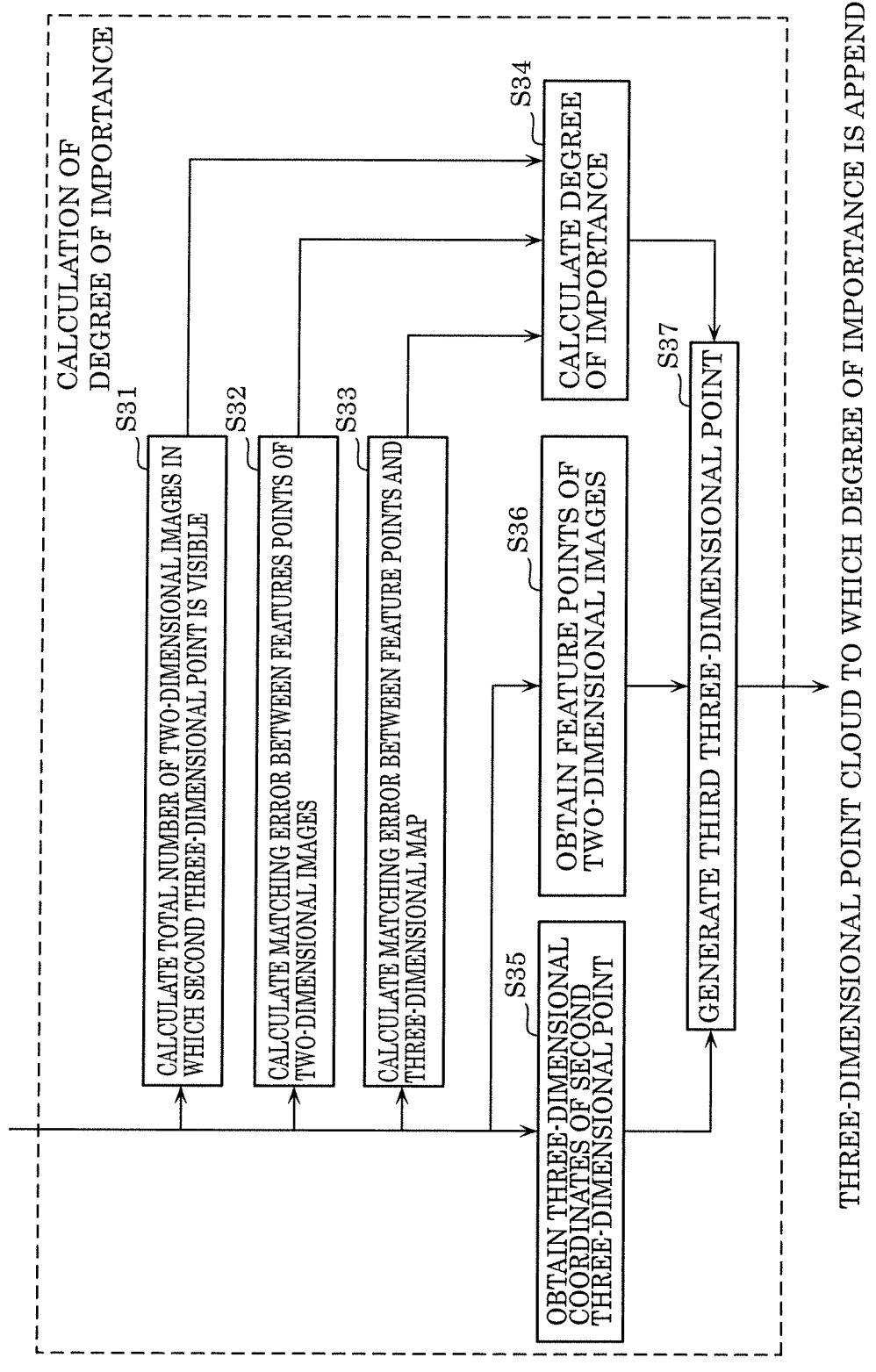
FIG. 9 is a flowchart of an example of a calculation process of a degree of importance in detail.

FIG. 9 is a flowchart of an example of the calculation process of the degree of importance in detail.

Point cloud registration module 123 performs the calculation process of the degree of importance for each of the second three-dimensional points included in the generated second three-dimensional point cloud. Hereinafter, the process will be described regarding one second three-dimensional point. In the calculation process of the degree of importance, the same process is performed for each of the second three-dimensional points.

Point cloud registration module 123 first calculates a total number of two-dimensional images in which a current second three-dimensional point is visible (S31). In the two-dimensional images, point cloud registration module 123 may calculate the above total number by counting a total number of two-dimensional images in which the current second three-dimensional point is visible.

Point cloud registration module 123 calculates a matching error in the matching of feature points associated with the current second three-dimensional point (S32). Point cloud registration module 123 may obtain the matching error from feature matching module 122.

Point cloud registration module 123 calculates a matching error in the matching between the current second three-dimensional point (i.e., three-dimensional point in the accurate three-dimensional map) and the feature points associated with the current second three-dimensional point (S33).

Point cloud registration module 123 calculates the degree of importance of the current second three-dimensional point, using (i) the total number of two-dimensional images in which the current second three-dimensional point is visible, (ii) the matching error between the feature points of the two-dimensional images, and (iii) the matching error between the three-dimensional map and the feature points, calculated in steps S31-S33 (S34). Point cloud registration module 123, for example, outputs a high value for the degree of importance with an increase in the total number of two-dimensional images in which the current second three-dimensional point is visible. Point cloud registration module 123, for example, outputs a low value for the degree of importance with an increase in the matching error between the feature points of the two-dimensional images. Point cloud registration module 123, for example, outputs a low value for the degree of importance with an increase in the matching error between the three-dimensional map and the feature points. In this manner, the degree of importance is an index indicating higher importance with an increase in value.

Point cloud registration module 123 obtains three-dimensional coordinates of the current second three-dimensional point (S35) and obtains the feature points of the two-dimensional image to which the current second three-dimensional point is appended (S36).

Point cloud registration module 123 then generates a third three-dimensional point by appending the calculated degree of importance and feature points to the obtained three-dimensional coordinates (S37). Note that in steps S35 and S36, the three-dimensional coordinates and the feature points are obtained from the current second three-dimensional points, but the present variation is not limited thereto, and in step S37, the third three-dimensional point may also be generated by appending the calculated degree of importance to the current second three-dimensional point.

Figure 10:
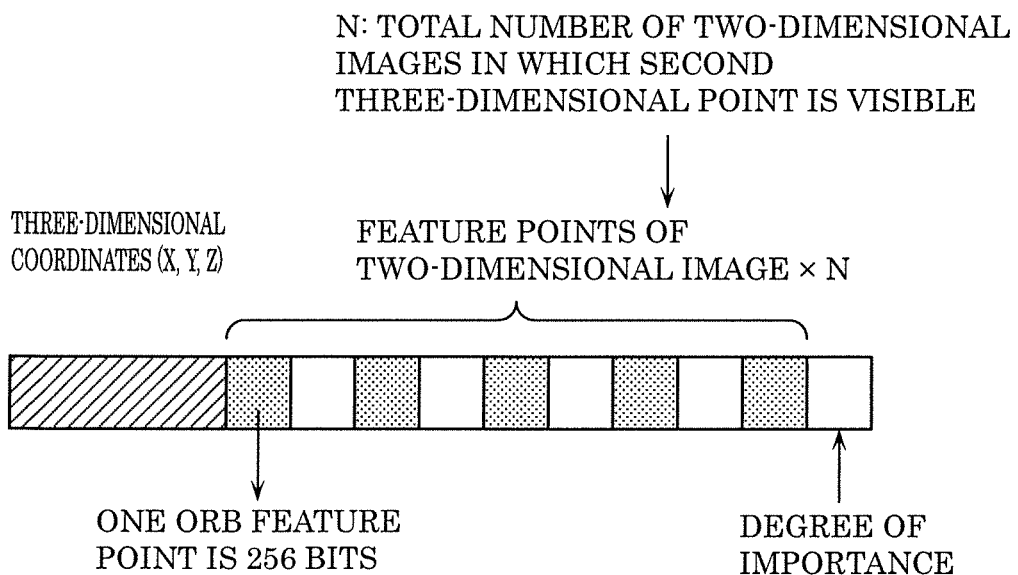
FIG. 10 is a diagram showing an example of a data structure of a third three-dimensional point.

Point cloud registration module 123 generates the third three-dimensional point cloud to which the degree of importance is further appended, by executing all of the processes in steps S31-S37 on each second three-dimensional point. As illustrated in FIG. 10, the third three-dimensional point includes the three-dimensional coordinates, the feature points of each of N two-dimensional images in which the second three-dimensional point is visible, and the degree of importance.

Among N feature quantities, feature quantities with similar values may be combined. For example, when values F0 and F1 of two feature quantities do not exceed a threshold value, the values may be combined into one feature quantity as the average value of F0 and F1. This makes it possible to reduce a data amount of the second three-dimensional point cloud. An upper limit may be set to total number N of feature quantities that can be assigned to the second three-dimensional point. For example, when the total number of feature quantities is higher than N, N highest feature quantities may be selected using the values of the feature quantities, and the selected N feature quantities may be assigned to the three-dimensional point.

The encoding process will be described in more detail later along with the detailed structure of encoder 130 with reference to FIG. 11 and FIG. 12.

Figure 11:
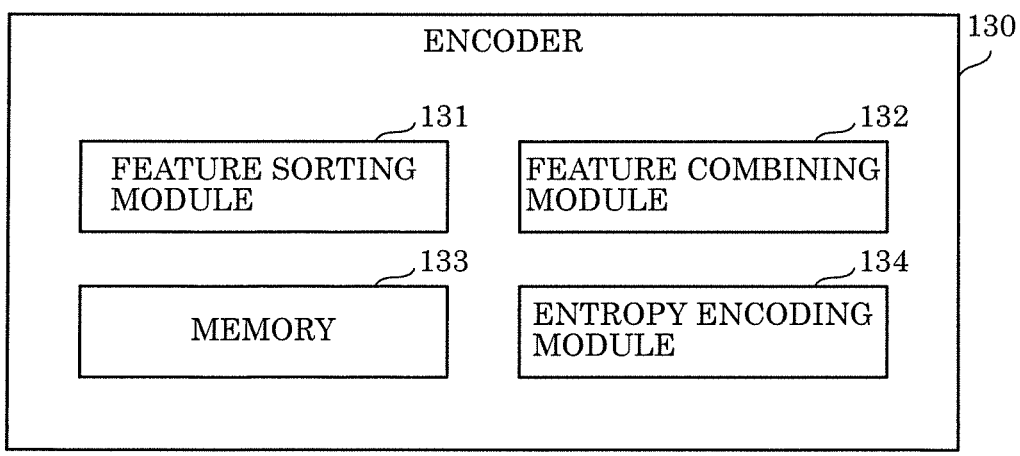
FIG. 11 is a block diagram showing an example of a functionality structure of an encoder.

FIG. 11 is a block diagram showing an example of a functionality structure of the encoder. FIG. 12 is a flowchart of an example of the encoding process in detail.

As illustrated in FIG. 11, encoder 130 includes feature sorting module 131, feature combining module 132, memory 133, and entropy encoding module 134.

In the encoding process performed by encoder 130, processes are performed on third three-dimensional points included in the third three-dimensional point cloud.

Feature sorting module 131 sorts the third three-dimensional points included in the third three-dimensional point cloud according to the degree of importance appended to each of the third three-dimensional points from high to low (S41).

Feature combining module 132 next starts loop 1 executing the processes of the following steps S43 and S44 for each of the third three-dimensional points (S42). Feature combining module 132 executes loop 1 according to the degree of importance from high to low.

Feature combining module 132 determines whether the degree of importance appended to the current third three-dimensional point exceeds a threshold value (S43). Note that the threshold value is a value received from vehicle 300. The threshold value may be set to a different value in accordance with specifications of vehicle 300. In other words, the threshold value may be set higher with an increase in information processing capacity and/or detection capacity of vehicle 300.

When feature combining module 132 determines that the degree of importance appended to the current third three-dimensional point exceeds the threshold value (YES in S43), the process of step S44 is executed.

On the other hand, when feature combining module 132 determines that the degree of importance appended to the current third three-dimensional point is lower than the threshold value (NO in S43), the process of step S45 is executed. With this, loop 1 is ended.

In step S44, feature combining module 132 adds the current third three-dimensional point as encoding target data (S44). Feature combining module 132 executes loop 1 with the next third three-dimensional point as processing target, after step S44.

In this manner, feature combining module 132 extracts, from the third three-dimensional points, fourth three-dimensional points to which a degree of importance that exceeds the threshold value is appended, by executing steps S43 and S44.

Note that the process of step S41 does not necessarily need to be executed. In this case, loop 1 is executed on all of the third three-dimensional points, and loop 1 is repeated for the next third three-dimensional point also when NO is determined in step S43.

In step S45, entropy encoding module 134 executes entropy encoding on the third three-dimensional points being the encoding target data, and generates the encoded stream (S45). Entropy encoding module 134 may, for example, binarize the encoding target data and express the encoding target data using an octree structure, and may also generate the encoded stream by arithmetically encoding the encoding target data.

In step S6 in FIG. 4, the generated encoded stream is transmitted to vehicle 300, which has transmitted the threshold value.

With the three-dimensional point cloud generation method according to Variation 1, in the generating of the second three-dimensional points, a third three-dimensional point cloud is further generated including third three-dimensional points each having the attribute value and a degree of importance, by performing, for each of the second three-dimensional points: (i) calculating the degree of importance of the one or more second three-dimensional points based on the attribute value appended to the second three-dimensional points; and (ii) appending the degree of importance calculated to the second three-dimensional points. Therefore, it is possible to, for example, adjust the data amount of the three-dimensional point cloud data using in the processes the precision of the processes is not impinged upon, since it is possible to preferentially use the third three-dimensional points with a high degree of importance.

In the three-dimensional point cloud generation method according to Variation 1, a threshold value is received from vehicle 300 being the client device, a plurality of fourth three-dimensional points to which the degree of importance exceeding the threshold value received is appended are extracted from the one or more third three-dimensional points, and a fourth three-dimensional point cloud including the plurality of fourth three-dimensional points extracted is transmitted to the client device. Therefore, it is possible to adjust the data amount of the three-dimensional point cloud data to be transmitted, in accordance with a request from vehicle 300.

Note that encoder 130 of three-dimensional point cloud generation device 100 according to the above Variation 1 obtains the threshold value from vehicle 300, but may also obtain the total number of three-dimensional points from vehicle 300. In this case, encoder 130 may encode, as the encoding target data, the same number of third three-dimensional points as the total number of the three-dimensional points obtained, according to the degree of importance from high to low.

Variation 2

In the above variation 1, three-dimensional point cloud generation device 100 excludes the third three-dimensional points with a degree of importance below or equal to the threshold value from the encoding target data, by receiving the threshold value from vehicle 300 being the client device, but the present variation is not limited thereto, and three-dimensional point cloud generation device 100 may also generate the encoded stream by encoding all of the third three-dimensional points as the encoding target data. In other words, three-dimensional point cloud generation device 100 may transmit the data in which all of the third three-dimensional points have been encoded to vehicle 300.

In this case, vehicle 300 obtains the third three-dimensional points by decoding the received encoded stream. Vehicle 300 may use, from the third three-dimensional points, the third three-dimensional points whose degree of importance exceeds the threshold value in a process of estimating the self-location of vehicle 300.

Note that decoder 340 of vehicle 300 may preferentially decode, among all of the three-dimensional points, the three-dimensional points with a higher degree of importance, when communicator 330 obtains all of the three-dimensional points. This makes it possible to reduce the processing load necessary for the decoding process, since only the necessary number of three-dimensional points may be decoded. In this case, when the encoded stream is encoded in accordance to the degree of importance from high to low, decoder 340 decodes the encoded stream, and may stop the decoding process the moment a three-dimensional point whose degree of importance is below or equal to the threshold value is decoded, and may also stop the decoding process the moment when the necessary number of three-dimensional points is obtained. This enables three-dimensional point cloud generation device 100 to reduce the processing load necessary for the decoding process without generating the encoded stream per vehicle 300. As such, it is possible to reduce the processing load necessary for generating the encoded stream, which is performed by three-dimensional point cloud generation device 100.

Note that vehicle 300 does not need to use the third three-dimensional points for the process of estimating the self-location of vehicle 300, and may also use the third three-dimensional points for a process of reconstructing a three-dimensional video of the three-dimensional map. In other words, vehicle 300 serving as the client device may change the threshold value in accordance with the application implemented by vehicle 300. For example, it is conceivable to (i) determine that only three-dimensional points whose degree of importance is high are necessary and set the threshold value as a first threshold value, when vehicle 300 performs the self-location estimation, and (ii) determine that the three-dimensional points whose degree of importance is low are also important and set the threshold value as a second threshold value which is lower than the first threshold value, when the client draws a map.

OTHERS

Mapping unit 120 may add, to the accurate three-dimensional map, the three-dimensional position calculated by matching the feature points in two two-dimensional images, as a three-dimensional point including the feature quantity of a corresponding feature point.

Mapping unit 120 may match the feature points in one two-dimensional image with the three-dimensional points of the accurate three-dimensional map, and append the feature quantity of the feature points to the three-dimensional point matched with the corresponding feature point. In this case, the feature points and the three-dimensional points of the accurate three-dimensional map may be matched by back-projecting the feature points to the three-dimensional space or projecting the three-dimensional points to the two-dimensional image, using the orientation of camera 210. In other words, mapping unit 120 matches the feature points with the three-dimensional points by identifying three-dimensional points closest to the three-dimensional position identified through matched pairs of feature points of two two-dimensional images of the two-dimensional images, but is not limited thereto, and may also match the feature points of one two-dimensional image with the three-dimensional points. In other words, mapping unit 120 may generate a second three-dimensional point cloud including one or more second three-dimensional points each having an attribute value, by performing, for each of the one or more attribute values detected: (i) identifying, from a plurality of three-dimensional points forming the first three-dimensional point cloud, one or more first three-dimensional points to which the position of the attribute value corresponds; and (ii) appending the attribute value to the one or more first three-dimensional points identified.

The encoding of the three-dimensional points is not limited to entropy encoding, and any type of encoding may be applied. For example, the three-dimensional point cloud being the encoding target data may be encoded using an octree structure.

Three-dimensional point cloud generation device 100 is a server different from vehicle 200, but may also be included in vehicle 200. In other words, the processes performed by three-dimensional point cloud generation device 100 may be performed by vehicle 200. In this case, the second three-dimensional point cloud or the third three-dimensional point cloud obtained by vehicle 200 may be transmitted to a host server, and the host server may collect the second three-dimensional point cloud and the third three-dimensional point cloud of each area from multiple vehicles 200.

Note that in the above embodiments, the structural components may be implemented as dedicated hardware or may be realized by executing a software program suited to such structural components. The structural components may also be implemented by a program executor such as a CPU or a processor reading out and executing the software program recorded in a recording medium such as a hard disk or semiconductor memory. The software implementing the three-dimensional point cloud generation method or the position estimation method of the above embodiments are like the following program.

Namely, this program causes a computer to execute a three-dimensional point cloud generation method for generating, using a processor, a three-dimensional point cloud including a plurality of three-dimensional points, the three-dimensional point cloud generation method including: obtaining (i) a two-dimensional image obtained by imaging a three-dimensional object using a camera and (ii) a first three-dimensional point cloud obtained by sensing the three-dimensional object using a distance sensor; detecting, from the two-dimensional image in the obtaining, one or more attribute values of the two-dimensional image that are associated with a position in the two-dimensional image; and generating a second three-dimensional point cloud including one or more second three-dimensional points each having an attribute value, by performing, for each of the one or more attribute values detected, (i) identifying, from a plurality of three-dimensional points forming the first three-dimensional point cloud, one or more first three-dimensional points to which the position of the attribute value corresponds, and (ii) appending the attribute value to the one or more first three-dimensional points identified.

This program also causes the computer to execute a position estimation method for estimating, using a processor, a current position of a moving body, the position estimation method including: obtaining a three-dimensional point cloud including a plurality of three-dimensional points to each of which a first attribute value is appended in advance, the first attribute value being an attribute value of a first two-dimensional image that is an imaged three-dimensional object; obtaining a second two-dimensional image of a surrounding area of the moving body that has been imaged by a camera included in the moving body; detecting, from the second two-dimensional image obtained, one or more second attribute values of the second two-dimensional image corresponding to a position in the second two-dimensional image; for each of the one or more second attribute values detected, generating one or more combinations formed by the second attribute value and one or more fifth three-dimensional points, by identifying the one or more fifth three-dimensional points associated with the second attribute value from the plurality of three-dimensional points; obtaining, from a memory device, a position and an orientation of the camera with respect to the moving body; and calculating a position and an orientation of the moving body using the one or more combinations generated, and the position and the orientation of the camera obtained.

A three-dimensional point cloud generation method, a position estimation method, a three-dimensional point cloud generation device, and a position estimation device according to one or more aspects of the present disclosure has been described above based on the embodiment, but the present disclosure is not limited thereto. The present disclosure may thus include forms achieved by making various modifications to the above embodiment that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional point cloud generation method, a position estimation method, a three-dimensional point cloud generation device, and a position estimation device capable of further improvement.

What is claimed is:

1. A three-dimensional point cloud data processing method for processing, using a processor, three-dimensional point cloud data, the three-dimensional point cloud data processing method comprising:
    obtaining (i) a two-dimensional image obtained using a camera and (ii) a first three-dimensional point cloud obtained using a distance sensor;
    detecting, from the two-dimensional image obtained in the obtaining, a feature value of the two-dimensional image, the feature value being associated with a two-dimensional coordinate value in a two-dimensional image and one of a plurality of first three-dimensional points included in the first three-dimensional point cloud;
    generating first three-dimensional point cloud data that includes a plurality of first three-dimensional point data items associated one to one with the plurality of first three-dimensional points included in the first three-dimensional point cloud, the plurality of first three-dimensional point data items each being a combination of (i) a three-dimensional coordinate value of an associated first three-dimensional point out of the plurality of first three-dimensional points, (ii) the feature value of the associated first three-dimensional point, and (iii) a confidence value of the three-dimensional coordinate value of the associated first three-dimensional point, each of the plurality of first three-dimensional point data items being associated with each of the plurality of first three-dimensional points included in the first three-dimensional point cloud; and selecting, based on the confidence value, a first three-dimensional point from among the plurality of first three-dimensional point cloud to output a first three-dimensional point data item associated to the selected first three-dimensional point, wherein the confidence value indicates certainty of a coordinate position of the first three-dimensional point, and wherein the confidence value is calculated based on a total number of two-dimensional images in which the associated three-dimensional point is observed, the confidence value increasing as the total number of two-dimensional images in which the associated three-dimensional point is observed increases.

2. The three-dimensional point cloud data processing method according to claim 1, wherein
in the obtaining, a plurality of two-dimensional images are obtained using the camera in different positions and/or orientations, the plurality of two-dimensional images each being the two-dimensional image,
in the detecting, the feature value is detected for each of the plurality of two-dimensional images obtained in the obtaining,
the three-dimensional point cloud data processing method further comprises:
matching feature values associated with two two-dimensional images from the plurality of two-dimensional images using the feature values detected for each of the plurality of two-dimensional images; and
outputting one or more pairs of the feature values matched.

3. The three-dimensional point cloud data processing method according to claim 1, further comprising
generating a second three-dimensional point cloud including one or more second three-dimensional points each having the feature value, the one or more second three-dimensional points being generated using one or more feature values and one of one or more first three-dimensional points from among the plurality of first three-dimensional points forming the first three-dimensional point cloud.

4. The three-dimensional point cloud data processing method according to claim 3, wherein
the one or more feature values are each detected from the plurality of two-dimensional images.

5. The three-dimensional point cloud data processing method according to claim 3, wherein
the one or more feature values include a plurality of feature values, each of the plurality of feature values being a different attribute type.

6. The three-dimensional point cloud data processing method according to claim 1, wherein
in the detecting, a feature quantity calculated for an area from among a plurality of areas forming the two-dimensional image obtained is detected as the feature value of the two-dimensional image associated with the one of the plurality of first three-dimensional points included in the first three-dimensional point cloud.

7. The three-dimensional point cloud data processing method according to claim 1, further comprising:
receiving a threshold value from a client device;
extracting, from the one or more first three-dimensional point cloud data, one or more second three-dimensional points to which the confidence value exceeds the threshold value received; and is appended; and
transmitting, to the client device, a second three-dimensional point cloud including the one or more second three-dimensional points extracted.

8. The three-dimensional point cloud data processing method according to claim 1, wherein the confidence value is calculated by using three-dimensional coordinates obtained by the distance sensor.

9. The three-dimensional point cloud data processing method according to claim 1, wherein an order of encoding the plurality of first three-dimensional points is determined based on the confidence value.

10. The three-dimensional point cloud data processing method according to claim 1, wherein the feature value is a combination of a plurality of elements.

11. The three-dimensional point cloud data processing method according to claim 1, wherein the feature value is expressed by a 256-bit data string.

12. The three-dimensional point cloud data processing method according to claim 1, wherein out of the plurality of first three-dimensional point data items, a first three-dimensional point data item having the confidence value that is high is made more likely to be selected than a first three-dimensional point data item having the confidence value that is low.

13. The three-dimensional point cloud data processing method according to claim 1, wherein the confidence value of the first three-dimensional point data item that is selected is greater than or equal to a threshold value.

14. The three-dimensional point cloud data processing method according to claim 1, wherein an encoding process is performed on the first three-dimensional point data item selected, and a resultant first three-dimensional point data item is output, the resultant first three-dimensional point data item resulting from performing the encoding process on the first three-dimensional point data item selected.

15. The three-dimensional point cloud data processing method according to claim 14, wherein an order of selecting the first three-dimensional point data item to be output from among the plurality of first three-dimensional point data items is determined based on the confidence value, the encoding process is performed based on the order, and the resultant first three-dimensional point data item is output.

16. The three-dimensional point cloud data processing method according to claim 15, wherein out of the plurality of first three-dimensional point data items, a first three-dimensional point data item having the confidence value that is higher is preferentially encoded to a first three-dimensional point data item having the confidence value that is lower.

17. The three-dimensional point cloud data processing method according to claim 1,
wherein the confidence value indicates certainty of
(a) correspondence between (i) a three-dimensional coordinate value of the associated first three-dimensional point and (ii) the two-dimensional coordinate value in the two-dimensional image, or
(b) correspondence between (i) the three-dimensional coordinate value of the associated first three-dimensional point out of the plurality of first three-dimensional points and (ii) the feature value of the associated first three-dimensional point.

18. The three-dimensional point cloud data processing method according to claim 1, wherein the confidence value is calculated using a matching error of multiple feature points corresponding to the associated three-dimensional point.

19. The three-dimensional point cloud data processing method according to claim 1, wherein the confidence value is calculated using a matching error between the associated three-dimensional point and feature points corresponding to the associated three-dimensional point.

20. A three-dimensional point cloud data processing device for processing three-dimensional point cloud data, the three-dimensional point cloud data processing device comprising a processor, wherein the processor:
- obtains (i) a two-dimensional image obtained using a camera and (ii) a first three-dimensional point cloud obtained using a distance sensor;
- detects, from the obtained two-dimensional image, a feature value of the two-dimensional image, the feature value being associated with a two-dimensional coordinate value in the two-dimensional image and one of a plurality of first three-dimensional points included in the first three-dimensional point cloud;
- generates first three-dimensional point cloud data that includes a plurality of first three-dimensional point data items associated one to one with the plurality of first three-dimensional points included in the first three-dimensional point cloud, the plurality of first three-dimensional point data items each being a combination of (i) a three-dimensional coordinate value of an associated first three-dimensional point out of the plurality of first three-dimensional points, (ii) the feature value of the associated first three-dimensional point, and (iii) a confidence value of the three-dimensional coordinate value of the associated first three-dimensional point, each of the plurality of first three-dimensional point data items being associated with each of the plurality of first three-dimensional points included in the first three-dimensional point cloud; and
- selects, based on the confidence value, a first three-dimensional point from among the plurality of first three-dimensional point cloud to output a first three-dimensional point data item associated to the selected first three-dimensional point, wherein the confidence value indicates certainty of a coordinate position of the first three-dimensional point, and wherein the confidence value is calculated based on a total number of two-dimensional images in which the associated three-dimensional point is observed, the confidence value increasing as the total number of two-dimensional images in which the associated three-dimensional point is observed increases.

* * * * *